United States Patent [19]

Knowlton

[11] Patent Number: 5,283,864
[45] Date of Patent: Feb. 1, 1994

[54] COMPUTER APPARATUS AND METHOD FOR GRAPHICAL FLIP BOOK

[75] Inventor: Kenneth C. Knowlton, Merrimack, Mass.

[73] Assignee: Wang Laboratories, Inc., Lowell, Mass.

[21] Appl. No.: 605,617

[22] Filed: Oct. 30, 1990

[51] Int. Cl.$^5$ ............................................. G06F 15/62
[52] U.S. Cl. .................................... 395/158; 395/159; 395/161
[58] Field of Search ............................... 395/155–161, 395/152, 128, 119, 275; 340/723, 721

[56] References Cited

U.S. PATENT DOCUMENTS

| | | | |
|---|---|---|---|
| 4,649,499 | 3/1987 | Sutton et al. | 395/119 |
| 4,860,217 | 8/1989 | Sasaki et al. | 340/723 X |
| 4,901,221 | 2/1990 | Kodosky et al. | 395/159 |
| 5,021,989 | 6/1991 | Fujisawa et al. | 395/275 |
| 5,072,412 | 12/1991 | Henderson, Jr. et al. | 395/159 |
| 5,113,493 | 5/1992 | Crosby | 395/152 |
| 5,140,678 | 8/1992 | Torres | 395/159 |
| 5,146,555 | 9/1992 | Kiyohara | 395/157 |
| 5,161,213 | 11/1992 | Knowlton | 395/128 |
| 5,202,961 | 4/1993 | Mills et al. | 395/159 |

FOREIGN PATENT DOCUMENTS

| | | | |
|---|---|---|---|
| 0373961 | 6/1990 | European Pat. Off. | G06F 15/02 |
| WO89/01658 | 2/1989 | PCT Int'l Appl. | G06F 3/033 |

OTHER PUBLICATIONS

Nielsen, "The Art of Navigating through Hypertext", Comm. of the ACM, Mar. 1990, pp. 298–309.
Myers, "Window Interfaces", Sep. 1988, IEEE Computer Graphics and Applications, pp. 65–84.
"Microsoft® Windows Users Guide", Version 2.0, 1987, pp. 16–37.
"FileMaker II", in Macuser Dec. 1988, p. 63.
"Using New Clues to Find Data" by Craig Fields and Nicholas Negroponte, IEEE Proceedings on Very Large Databases 1977, pp. 156–158.
"Books Without Pages" by Nicholas Negroponte, IEEE Proceedings of the International Conference on Communications, 1979 pp. 56.1.1–56.1.8.

*Primary Examiner*—Gary V. Harkcom
*Assistant Examiner*—John E. Breene
*Attorney, Agent, or Firm*—Kenneth L. Milik

[57] ABSTRACT

Computer apparatus and method replicates a book in screen views of a video display unit. A book representation is formed of a multiplicity of entities positioned in a series and successively overlapping each other. Data of only non-overlapped entities or portions thereof are viewable. Processor means changes display of the series such that desired entities are displayed non-overlapped in a respective position in the series. Each entity succeeding the desired entity in the series overlaps a respective succeeding entity, if any, and each entity preceding the desired entity in the series overlaps a respective preceding entity, if any, to display the desired entity non-overlapped in the series. Screen view position of viewable data in the series thus changes as a function of entity providing the data and corresponding serial position of the entity. A processor procedure adjusts position of user definable tabs coupled to entities to maximize viewability of tabs. Page numbers and other markers are employed to provide indications of the positions of the entities in the series. Alternatively, entities nearest the non-overlapped entity are less overlapped by neighboring entities than entities farther away from the non-overlapped entity are overlapped by respective neighboring entities.

27 Claims, 17 Drawing Sheets

COMPUTER APPARATUS AND METHOD FOR GRAPHICAL FLIP BOOK

BACKGROUND OF THE INVENTION

In a data processing system, a digital processor executes various programs and produces output to program designated destinations, such as a memory file, video display or printer to name a few. In an interactive program, output is continuously generated and displayed on a video display for user viewing during program execution. Various icons and interface graphics are employed in output screen views for increased intuitiveness and ease of use.

One example of commonly used interface graphics is the case of a multiplicity of items displayed in a screen view. The interface graphics and user interface therewith enable the user to combine the items into a collection and to represent the collection by an icon. The user is then able to act on the collection of items together by acting on the icon instead of acting on each item individually one at a time. Generally, the icon does not preclude the user from acting on individual items as desired. Thus, the interface graphics and icons provide a certain amount of user friendliness in the handling of plural items in a data processing system.

One disadvantage of commonly used icons and interface graphics involves the two-dimensional geometry of such elements in a screen view of a video display. For example, a folder icon holding a one page document typically appears to be the same shape and size as a folder icon holding several multi-page documents. That is, the folder icon does not show thickness and hence, volume of contents until "opened" or otherwise acted upon by the user. More recently, some icons have been made to appear three-dimensional so as to provide a general indication that a number of items are associated with the icon.

Another disadvantage of commonly used interface graphics and icons involves the functionality thereof. In particular, where an icon represents an everyday office object, such as a folder, address book or calendar, the functionality of the icon should mirror that of the corresponding object to truly provide user friendliness. Typically, some functions of an icon mirror that of the corresponding object while other functions of the icon are dictated by protocol of the data processing system and/or consistency with other system operations. To satisfy this mixture of competing interests, user friendliness is often compromised.

Thus, there is a need for improved interface graphics and icons in data processing systems.

SUMMARY OF THE INVENTION

The present invention provides computer apparatus and method for mimicking a book in screen views of a video display. In particular, the present invention provides a multiplicity of data bearing entities changeably positioned in a series and aligned with each other along an axis. Each entity substantially overlaps one of a respective preceding and succeeding entity such that data of only non-overlapped portions of entities are viewable. Processor means of the present invention are employed to respond to user selection of a non-overlapped portion of a desired entity in the series. The processor means responds by displaying the desired entity non-overlapped in the series such that data of the desired entity is viewable. To accomplish this, the processor means changes display of the series such that each entity succeeding the desired entity in the series is displayed substantially overlapping a respective succeeding entity and each entity preceding the desired entity in the series is displayed substantially overlapping a respective preceding entity.

Further, as a function of serial position in the series, each entity has a different screen location or position between opposite side of the screen view. When an entity is displayed non-overlapped, it is displayed positioned at its respective screen location with the remaining portions of the series of entities overlapped and extending from opposite sides of the non-overlapped entity to the sides of the screen view. As a result, the screen view position of viewable data, i.e. from one non-overlapped entity to the next successively from one end of the series to an opposite end, changes successively from one side of the screen view to an opposite side. To that end, the present invention graphically represents the act of flipping through the pages of a book by displaying (i) one entity at a time in series order, non-overlapped in its corresponding screen position with succeeding entities overlapping one another in series and preceding entities overlapping one another in series, and (ii) screen position of the non-overlapped entity changing in increments from screen position of one end (cover) of the book representation to screen position of the other end of the book representation.

Accordingly, the entities may serve as leaves of the book representation and preferably two sided (frontside and backside) leaves. In that case, only one side of each leaf is viewable at a time where each leaf backside when viewable overlaps a respective preceding leaf backside and each leaf frontside when viewable overlaps a respective succeeding leaf frontside. Further, the book representation is displayed in open, closed and page-turning states.

In accordance with one aspect of the present invention, a graphical representation of a thick book and operations thereof is provided by computer means.

In accordance with another aspect of the present invention, a plurality of tabs are removably coupled to desired entities. The tabs may be user definable in dimension, message/pattern design and position on a respective entity. Predetermined pattern designs and/or positions from which a user may select may be employed. Further, in a preferred embodiment of the present invention, a procedure executed by the processor means automatically adjusts position of the tabs on respective entities. The procedure is executed as part of the processor means changing the display of the series to maximize viewability of the tabs.

Upon user selection of a tab, the processor means displays the entity to which the tab is coupled, non-overlapped in respective series position. The processor means accomplishes this by changing the display of the series such that each succeeding entity of the selected tabbed entity in the series overlaps a respective succeeding entity and each preceding entity overlaps a respective preceding entity.

In another embodiment of the invention, entities closer to a non-overlapped entity are less overlapped by respective preceding or succeeding entities than entities farther away from the non-overlapping entities are overlapped by respective preceding or succeeding entities. To that end, the series of entities represents a thick book which when opened has pages less overlapped near the opened pages than pages further away from the open pages, and closer to the end of the book are overlapped by neighboring pages.

In accordance with another aspect of the present invention, the entities bear respective serial numbers like pages in a book. Also, other indications of the position of each entity in the series are provided. One such indication includes markers at every certain number entity, e.g. every tenth or hundredth entity, in the series. For another such indication, low digit of a page number may be indicated in a non-overlapped corner of an entity.

Additionally, a computer procedure for reordering serial position of entities may be employed and/or computer means for displaying additional information corresponding to an entity upon user command may be employed. Also, a computer procedure for inserting and removing entities from the series of entities is employed.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENT

Figure 1:
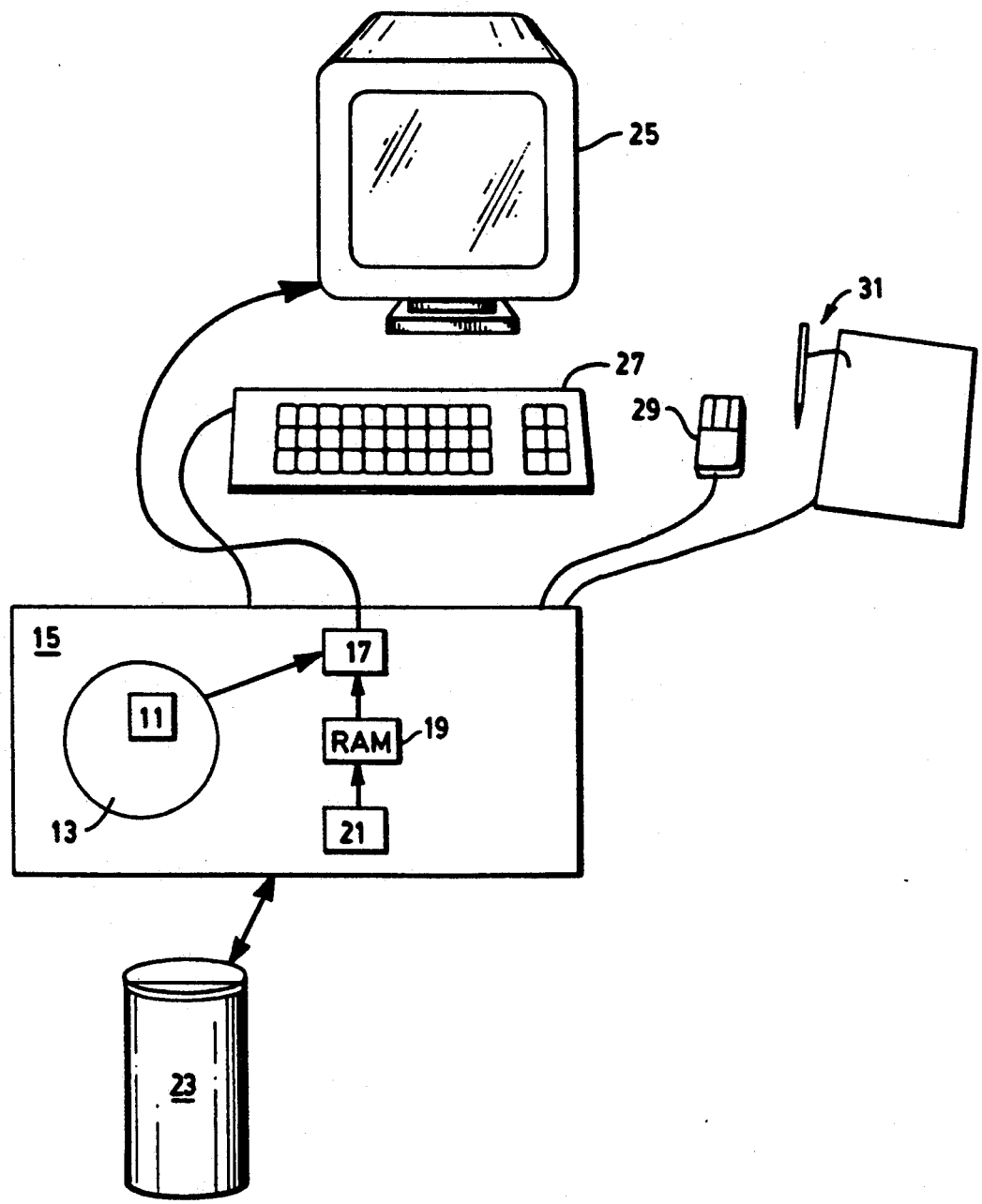
FIG. 1 is a schematic view of a data processing system employing the present invention.

Generally speaking, the present invention discloses computer graphic apparatus which provides a representation of a thick book or large collection of entities in a series and user interface therewith. In particular, the invention computer apparatus displays a book representation in various states in response to user interaction therewith. The various states of the book representation include, but are not limited to, "closed" with the front cover in full display, open to a certain page (or pair of facing pages), flipping through various pages in succession, and "closed" with the back cover in full display.

The book representation is conceptually structured as an ordered stack or succession of units called leaves. Each leaf comprises two sides, one which always faces toward the beginning of the succession (or top of the stack) and one which always faces toward the end of the succession (or bottom of the stack). Hence, each leaf is maintained in both serial order and frontside-backside orientation in the succession, like pages in a book or binder. Each leaf side provides a page of information or may be generally thought of as an entity bearing data desired to be displayed. The information/data includes images as well as text and graphics.

In a preferred embodiment, the first leaf and last leaf of the succession of leaves serve as a front cover and back cover, respectively, of the book representation. Optionally, as to the first and last leaves, only the front side of the first leaf and backside of the last leaf provide information as desired. For example, title, author/editor and date of the collection of information may appear on the front cover while "The End" appears on the back cover. Further the leaf at the top of the stack and in particular the frontside of that leaf (i.e. the side facing the beginning of the succession) is one of the pair of pages to which the book is open. Only the information-data of that pair of pages is displayed in full (i.e. is wholly viewable) in the book representation.

Accordingly, to "open" the book representation

Accordingly, to "open" the book representation to a certain leaf side (page), the leaves with sides preceding the desired leaf side are moved in serial order from the top of the stack, frontside facing up, to frontside facing down on a first stack half. Hence, the first leaf of the succession of leaves is at the bottom of the first stack half frontside facing down, and the moved succeeding leaves are, in succession, frontside facing down on top of the first leaf to form the first stack half. The leaves succeeding the desired leaf remain in series order and in frontside facing up orientation in the initial stack, i.e. the remaining stack half. The information/data of the upward facing leaf sides at the top of the two stack halves provide the pair of facing pages to which the book representation is currently open.

The information/data of only these two pages is displayed in full in the book representation. Subsequent changes in pages to which the book representation is open, are similarly accomplished by moving leaves between stack halves in serial order and in frontside facing beginning of the succession and backside facing the end of the succession orientation.

Pages preceding the pair of pages to which the book representation is open (i.e. leaves of the first stack half) are displayed overlapping one another in series extending from one side of the two "open" pages. And pages succeeding the pair of pages to which the book representation is open (i.e. leaves of the second stack half) are displayed overlapping one another in series extending from an opposite side of the two "open" pages.

Further, to effect the three dimensional appearance and behavior of the book representation (i.e. so that the book representation is regarded by the user as being a large number of pages thick), Applicant provides the following. Each leaf side (page) of the book representation has a respective location or position in the screen view at which the page is displayed in full view (i.e. when the book representation is displayed open to that page). In particular, screen view positions of the front sides of the leaves are, in serial order, incrementally spaced across the screen view from one side to an opposite side of the screen along an axis. And screen view positions of the backsides of the leaves are, in serial order, incrementally spaced across the screen view from the one side to the opposite side along the axis. In addition, the screen view positions of the leaf backsides are offset from the leaf frontsides screen view positions, such that facing pages (i.e. a backside of one leaf and frontside of the succeeding leaf) of the open book representation are displayed adjacent each other. To that end, screen view position of a pair of facing pages to which the book representation is open changes as a function of serial position of the pages (corresponding leaves) in the succession of leaves forming the book representation.

Said another way, the succession of leaves forming the book representation lies along an axis of the screen view. When the book representation is displayed open to a page at the beginning of the succession of leaves forming the book representation, that page is displayed positioned near one end of the axis. When the book representation is displayed open to a page in the middle of the succession of leaves forming the book representation book, that page is displayed positioned at the middle of the axis in the screen view. When the book representation is displayed open to a page toward the end of the succession of leaves forming the book representation, that page is displayed positioned near the opposite end of the axis. Thus, in the display of a series of pages being flipped in serial order from one page to a destination page, the screen view position of the viewable (in full view) page to which the book representation is momentarily open moves along the screen view axis in the direction of the screen position of the destination page.

Various tabs for flagging a particular page (leaf side) and various markers for indicating serial position of a page in the book representation are also employed by the present invention as described next with reference to various embodiments of the present invention.

Preferably, an embodiment of the present invention is a software program employed in a data processing system such as the one illustrated in FIG. 1. Generally, the data processing system includes a digital processor 15 which executes the invention software program 11 in an interactive task 13. Various I/O devices of the data processing system provide user interface with the invention program 11 during execution thereof. In particular, a video display unit 25 coupled to the digital processor 15 displays in various screen views output of the invention program 11 during execution thereof. A keyboard 27, mouse 29, and/or stylus 31 and tablet coupled to the digital processor 15 generate and relay user input to the invention program 11 during execution thereof.

The display unit 25, keyboard 27, mouse 29, stylus 31/tablet and other I/O devices form a user workstation terminal. One or more such user workstation terminals may be coupled to the digital processor 15 over a local area network (LAN) or other buses in a network configuration. In the case of a network, a copy of the invention software program 11 resides in each workstation and plural copies may be run at a time in respective workstations. In the case of a single user workstation terminal, the digital processor 15 may be of the single task type such that just one copy of the invention software program 11 is executed at a time.

A preferred user workstation terminal is disclosed in U.S. application Ser. No. 245,419 assigned to the Assignee of the present invention. The details of that workstation and user interface using a stylus and tablet described therewith are herein incorporated by reference. Hereafter, references to "user selection" refers to a positioning of the screen view cursor on a desired displayed item and the activating of an input device (e.g. operation of a keyboard key, mouse button or stylus end). References to "user positioning of the screen view cursor" refers to movement of the cursor by keyboard keys, mouse movement over a working surface, or stylus movement with respect to a tablet surface.

Figure 2A:
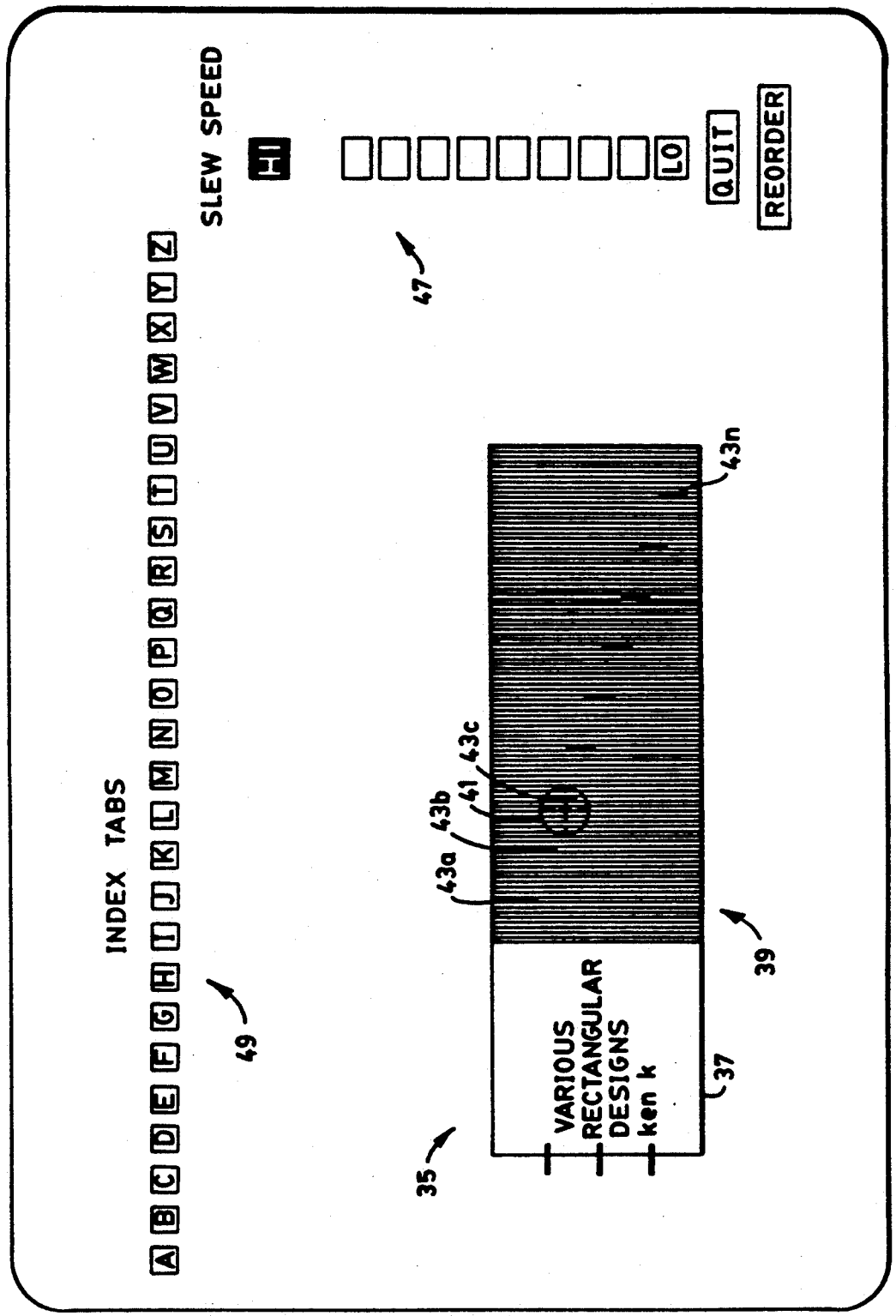
FIGS. 2a-2i are illustrations of screen views of one embodiment of the present invention.

FIGS. 2a-2i provide a series of screen views illustrating operation of one embodiment of the present invention. In FIG. 2a, the book representation 35 is shown "closed" with a cover 37 (front side of first leaf) bearing various indicia. A series of vertical stripes 39 adjacent one side of the cover 37 represents the succession of leaves that form the bulk of the book representation 35. In essence, each leaf is substantially overlapped by a preceding leaf such that only an edge portion (illustrated as a stripe) of each leaf is exposed. The only time a leaf is shown non-overlapped (i.e. in full page view) in the book representation 35 is when the book representation 35 is open to one side (front or back) of that leaf. In that case, a pair of facing leaf sides (i.e. a backside of one leaf and a frontside of a succeeding leaf) are displayed non-overlapped. And each leaf preceding the non-overlapped leaf frontside is displayed substantially overlapping a respective preceding leaf and each leaf succeeding the non-overlapped leaf backside is displayed substantially overlapping a respective succeeding leaf.

Illustrating the series of leaves 39 of the book representation 35 in this way not only produces the thick appearance of the book representation 35 (i.e. produces the illusion of a third dimension in a two-dimensional screen image), but also shows serial position of each leaf with respect to the ends of the book representation 35. That is, the closer the stripe 39 is displayed to the cover 37, the closer the corresponding leaf is to the beginning of the succession of leaves forming the book representation 35; and the farther away the stripe 39 is displayed from the cover 37, the closer the corresponding leaf is to the end of the succession.

Accordingly, to open the book representation 35 to a desired page, the user selects the corresponding stripe 39 which represents the leaf comprising the desired page. To aid in this selection, the screen cursor 41 is preferably t-shaped (such as the cross hairs of a sighting reference) or of similar geometry. Also, a thumb tab 43 is coupled to every certain number of stripes (leaves) 39, for example, every tenth leaf (or twentieth page). Thus, if the user wants to open the book representation 35 to say Pages 54-55, the user positions the cursor 41 on a stripe two thirds of the way from the second thumb tab 43b to the third thumb tab 43c to the right of the cover 37 (corresponding to Pages 40 and 60 in the book representation) as illustrated in FIG. 2a, and operates a pertinent input device (i.e. keyboard key, mouse button, stylus end). It is evident from the manner of display that alternative positions, sizes and labellings of the thumb tabs 43 is possible.

Figure 2B:
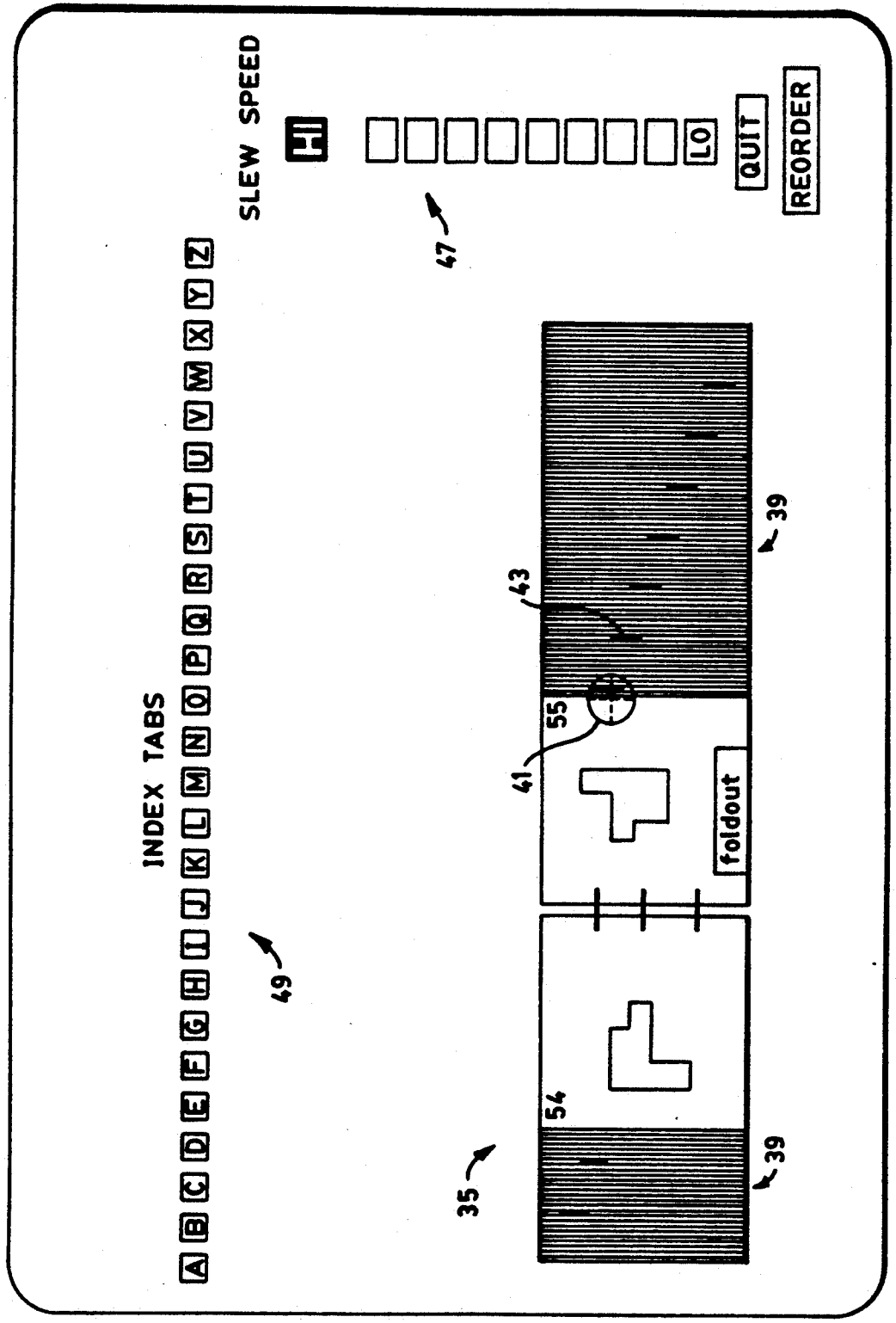

Upon the click of a mouse 29 button or pen down operation of the stylus 31 or operation of the keyboard 27 key, signals are generated from the input device to the invention program 11 running in processor interactive task 13 (FIG. 1). The invention program 11 interprets the signals using the bitmap 17 of the screen view of FIG. 2a and cursor 41 position therein, and changes state of the book representation 35 to "open" to the user selected page. This is accomplished by the invention program 11 changing bitmap 17 (FIG. 1) to display the cover 37 of the book representation 35 flipped open and succeeding leaves 39 turning onto the backside of the open cover 37 in sequence, until the book representation 35 lay open to the page to which the cursor 41 points and, hence, to the page selected by the user. The resulting screen view is illustrated in FIG. 2b with the book representation 35 open to Pages 54 and 55. As will be made obvious throughout FIGS. 2b-2i, each page number is preferably assigned to respective page data, such that page data and corresponding page number are not displayed on different leaf sides.

Specifically, the invention program 11 operates on the premise that, in series order, each leaf frontside (i.e. pages facing the cover 37) has a respective screen position progressively further rightward of (or closer to one end of a screen axis than) the screen position of the cover 37. And likewise, in backward serial order, each leaf backside (i.e. pages facing away from cover 37) has a respective screen position progressively further leftward of (or closer to an opposite end of the screen axis than) the screen position of the back cover (i.e. last leaf backside). And as mentioned previously, the screen view position of leaf backsides are offset from the positions of the leaf frontsides such that pairs of facing pages in the book representation 35 lie adjacent or nearly adjacent each other.

Hence, the invention program 11 redraws the portion of the book representation 35 that lies to the left of the edge portion or representative stripe 39 of the user selected page in the illustrated example of FIG. 2a. Or more generally, to display the book representation 35 change from a current state to a state "open" to a user selected page, the program 11 redraws the book portion between the cover 37 (if displayed) or page to which the book representation 35 is open in the current state and the edge portion of the user selected page.

In redrawing the subject book portion, the invention program 11 sets bits of the bitmap 17 to display in full view the leaf side corresponding to the selected page at its respective screen view position in the book representation 35 (i.e. with a pertinent right hand or left hand edge along the corresponding stripe 39 selected by the user). The invention program 11 also sets bits of the bitmap 17 to display in full view the page (leaf side) facing the selected page at its respective screen view position adjacent the selected page in the book representation 35. In a preferred embodiment, a gap of predetermined width is left between the pair of facing pages. For the remaining part of the book portion being redrawn, the invention program 11 sets bits of the bitmap 17 to display a series of stripes 39 adjacent the outer facing edge of the newly displayed facing page. This series of stripes 39 continues from the series of stripes (if any) in the book portion which is not being redrawn.

Figure 2C:
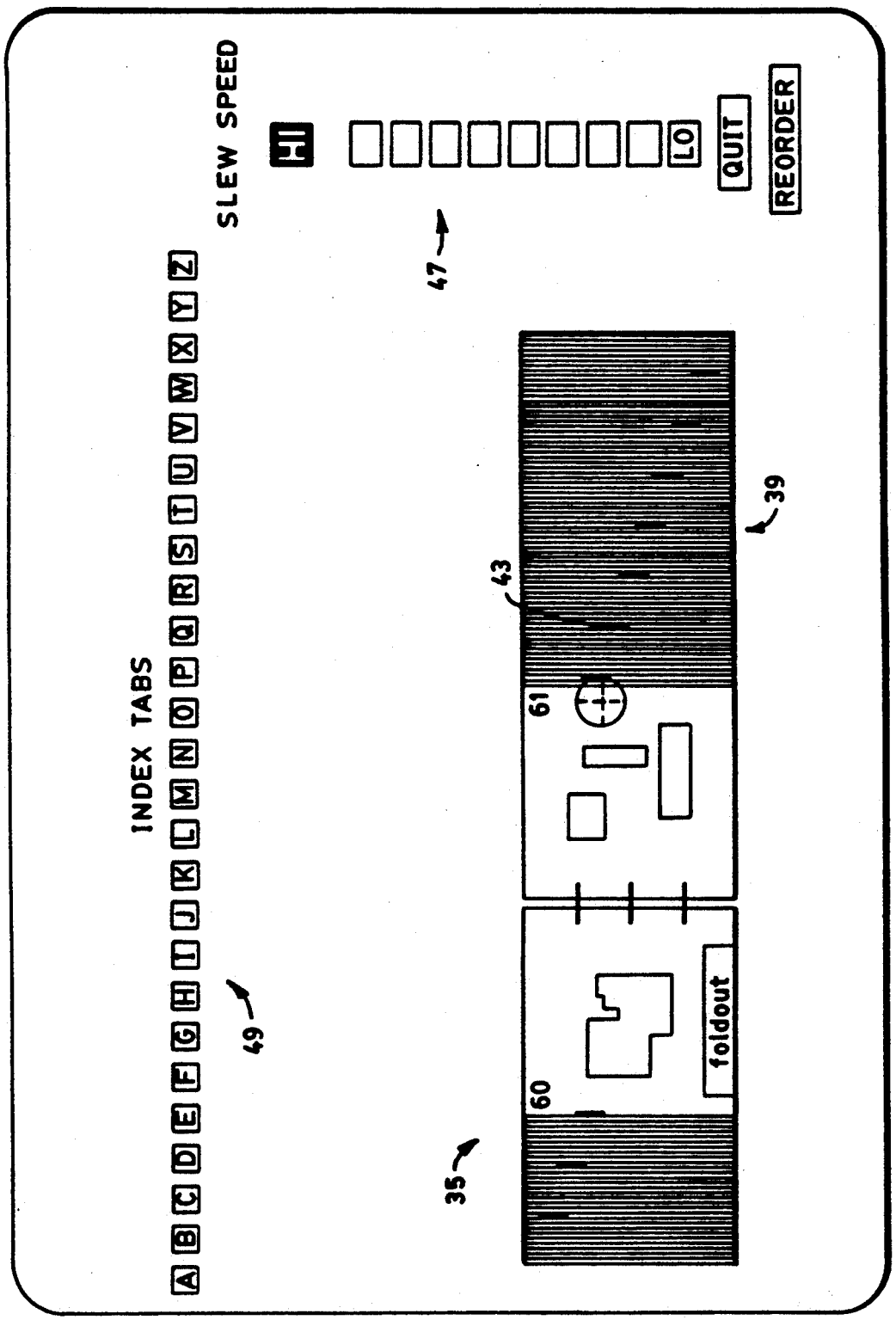
Figure 2D:
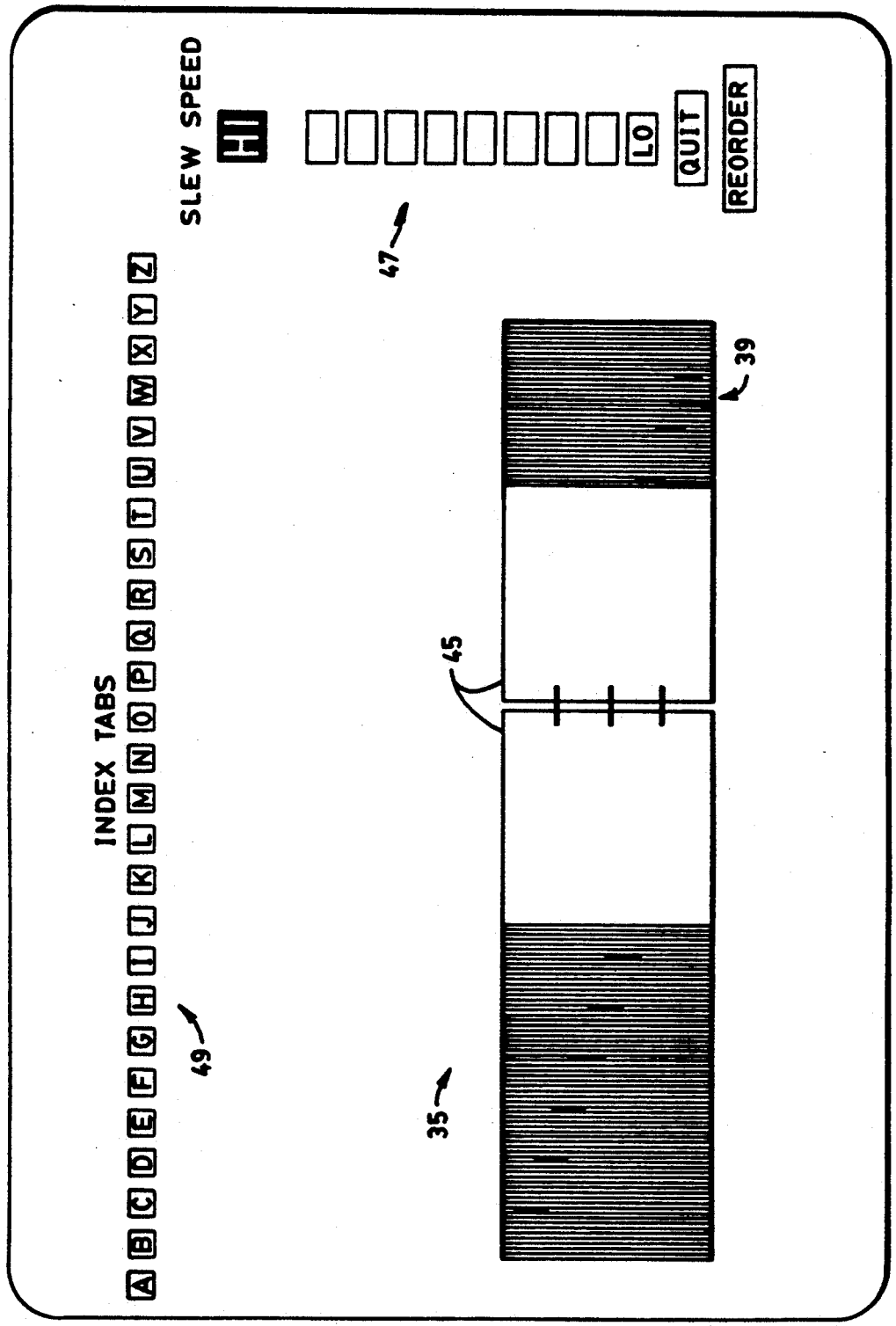

During user selection of a desired page, the user may maintain activation of the input device (by keeping the stylus 31 operated in the pen-down mode, or by keeping the mouse button 29 depressed). This results in additional signals generated to the invention program 11 to move the cursor 41 in the direction of user movement of the input device and subsequently cause further leaves 39 to flip to arrive at the page corresponding to cursor position. For example, before or after arriving at the screen view of FIG. 2b and having left the stylus 31 activated (or mouse button depressed), the user may move the cursor 41 an amount to the right (or left). This causes a number of leaves 39 succeeding (preceding) the currently displayed full view page to flip. The number of leaves which are turned equals the number of stripes 39 across which the user moves the cursor 41. The resulting book representation 35 stabilizes at (i.e. lies open to) the page to which the cursor 41 currently points. As illustrated in FIG. 2c, the book representation 35 changes to Page 61 from Page 55 in FIG. 2b in this example.

Hence in its state of opening to a selected page, the book representation 35 remains actively responsive to user movement of the cursor 41 (to the right or left across stripes 39) so long as the input device is maintained in active operation (i.e. the stylus 31 is maintained in the pen-down mode or the mouse 29 button is maintained depressed).

To open the book to different pages distant from each other, the user need not actually maintain activation of the input device and move the cursor 41 across each leaf corresponding to the intervening pages until the desired page is reached. Instead, the user may operate the input device multiple times for multiple selections. That is, the user may select and reselect different stripes 39 (leaf sides), one stripe at a time, in the book representation 35 as described in FIG. 2a. In response, the invention program 11 flips the intervening pages (leaves 39) between the current page to which the book representation 35 is opened and the newly selected page (leaf) as described previously.

Each page (leaf side) may have various data for different applications. In the illustrated figures, the pages of the book representation 35 have abstract designs which may have meanings for some particular user. These could as well be menu icons of some computer program (e.g. possible menu icons on one page of a pair of pages to which the book representation 35 is open and words of description on the other page of the pair of facing pages). Or the data of the pages could be small pictures of documents, or representations of sub-directories and files of a file system, or other sets of items to be scanned or browsed through.

Whatever the meanings of the page data of such a book representation 35, whenever a useful or interesting page is found, it can be examined or read, or arrangements can be provided to (i) display an enlargement of it or a set of related material, or (ii) enter an appropriate sub-program, depending on the nature of the application in which the invention program 11 is embedded. Those familiar with the state of the art of interactive program design will imagine a variety of possible excursions that can be taken, most of which will eventually revert to the visual display of the book representation 35 as described herein.

In the preferred embodiment, there are basically two different modes of page flipping (leaf turning), fast and slow. Generally, the fast rate of flipping is used when the user has no interest in seeing intermediate material. The fast rate of flipping is achieved by showing blank full view pages 45 (FIG. 2d) for the intervening pages between a current page to which the book representation 35 is open and a targeted page to which the book representation 35 is desired to be opened. To accomplish this, during the above described redrawing steps of the invention program 11, bits of the bitmap 17 are set to display blank full view intermediate pages to which the book is opened during flipping. Also, the present invention program 11 sets the bitmap 17 to display the series of stripes 39 on pertinent sides of the blank pages during flipping.

The slower rate of flipping causes all appropriate data/information (icons, text or graphics) to appear on pages (leaf sides) as the open book representation 35 is displayed to them. This allows the user to look for something easily recognizable by starting at one end of the book representation, choosing a slower flipping rate and requesting the book representation to be opened momentarily to each page in serial order to the other end of the book representation. The present invention program 11 displays each page/leaf turning in serial order unless or until the user intervenes by selecting the page to which the book representation 35 is currently open. The input devices are operated as described previously to make the selection. If the selection is made a page or two late, the user continues to activate the input device and moves the cursor 41 backward across the turned leaves 39 to the desired leaf to reverse the last few page turns as described previously.

In the preferred embodiment as illustrated in FIGS. 2a–2d, the flipping rate is user selectable through selection icons 47 labeled "high" to "low" under the heading "slew speed". Each of the selection icons 47 produces a different signal to the invention program 11 to define value of a flipping rate variable. If value of the flipping rate variable is above a predefined threshold, then the present invention program 11 provides the fast rate of flipping using blank intermediate pages. If the flipping rate variable value is below the threshold by a certain amount, then the invention program 11 displays the data on each intermediate page during flipping. For flipping rate variable values between the threshold and the value for slow rate of flipping, the present invention program 11 provides a range of intermediate rates. Each medium rate of flipping uses blank or graphic intermediate pages but provides page numbers and different amounts of pause time between page flips. Further details are provided below with reference to another embodiment of the present invention.

Figure 2E:
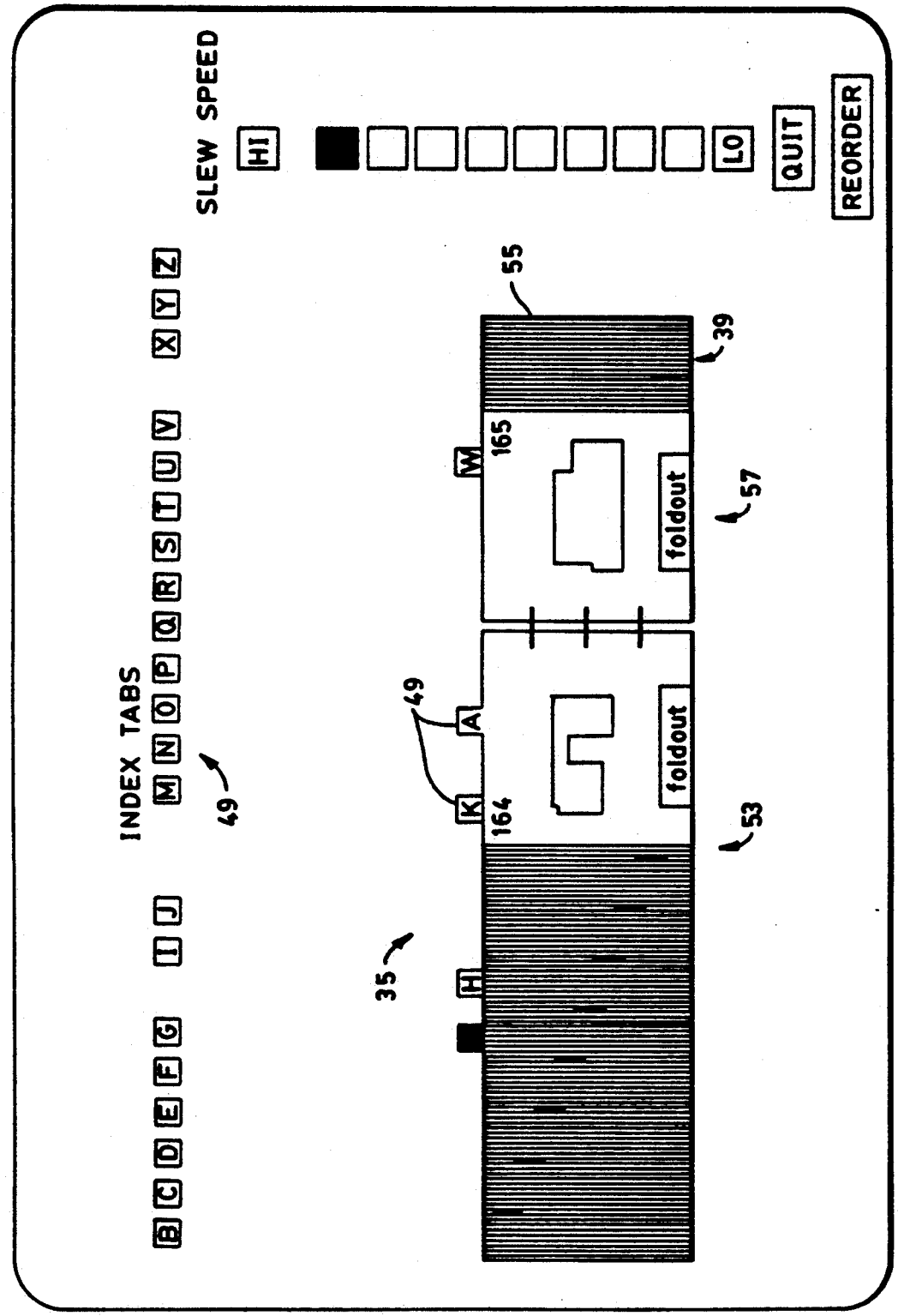

Another feature of the present invention is a set of tabs which are removably connectable to desired pages (leaf sides) of the book representation 35. FIG. 2e illustrates tabs 49 in use. A plurality of predefined tabs 49 are provided in the screen view. The user may move a tab 49 from its original screen view position to or near the top of an open page (i.e. leaf side to which the book representation 35 is open) through operation of an input device. Upon the tab 49 coming within a certain distance away from the open page, the invention program 11 attaches the tab 49 to the page as an extension of the page illustrated by tab "A" attached to Page 164 in FIG. 2e. Thereafter, the tab 49 while attached to the page (leaf side) flips with the page and has a frontside as well as a backside. To illustrate this feature, the tab's L, H, K and W 49 in FIG. 2e are currently in use. Tab L is displayed darkened to indicate that its backside is showing, and that it is attached to a leaf frontside (i.e. right hand page) which in FIG. 2e is currently flipped over (i.e. face down). Tabs 49 coupled to respective pages are active in the sense that user selection of such a tab is equivalent to selection of the page coupled thereto, thus causing the book representation 35 to flip leaves successively until the book representation is opened to that page.

It is understood that tabs 49 may be made to connect to any outer edge of book pages as desired. For ease of understanding and not by way of limitation, the figures illustrate and the discussion herein describe tabs connected to the upper edge of pages.

Although the illustrated tabs 49 are predefined single letters, other tab geometries and labelling schemes are suitable. For example, the tabs could be sized to accommodate more letters and their labellings could be user definable by keyboard input and the like. To that end, user-designed tabs containing several letters or even words may be provided.

In one embodiment, when a tab 49 is coupled to a page (leaf side), the tab is centered along the upper edge of the page. This has the disadvantage of some tabs obscuring the other tabs. This is particularly the case if the tabs 49 occur on nearby pages and/or if wider (multi-letter bearing) tabs are allowed.

The situation is relieved in another embodiment that allows tabs to slide horizontally along their respective page edges (upper edge) instead of only coupling tabs 49 to the center of a page upper edge. To that end, for any particular book opening (i.e. position in the series of pages to which the book representation 35 is open), tabs that conflict spatially are displayed optimally arranged according to a set of constraints and a placement procedure that mediates contention. The preferred embodiment of program 11 employs the constraints and placement procedure described next. It is understood that the same procedure might be used for other one-dimensional placement problems where there is not enough space to display every item in its entirety.

One constraint dictates that each tab never extends past either the left end, or the right end, of the upper edge of the page to which the tab is coupled. Consequently, no tab can be wider than a page width. Alternatively, one might restrict the total width of the set of tabs 49 to the entire screen width, or to the entire horizontal span of the book representation 35.

To optimize visibility of tabs 49 of the book representation 35 one of two premises is followed so far as possible. One premise provides equal display space to contending tabs. The other premise provides display of the same percentages of contending tabs (i.e. gives more space to the wider tabs). In other respects, it is desirable to preserve in the book representation 35 most of the physical-reality aspects of page-flipping in an actual book. That is, each tab is opaque, its caption does not change as a function of page flipping nor the dispositions of other tabs, nor does it size change.

The placement procedure recalculates tab display positions after each significant change of the book representation 35. In particular, program 11 calls the placement procedure (1) when the width of a tab in use is changed or when a tab is attached or removed from an open page and (2) whenever a page (side of a leaf) holding one or more tabs is flipped. In the former case, the placement procedure repositions the tabs on the pages in the same half of the open book representation 35 that the subject open page lies. In the latter case, the placement procedure repositions tabs on the pages in both halves of the open book representation 35. For each half of the open book representation 35, tabs are treated according to page to which they are coupled, in series order from the beginning/end of the book representation 35 toward the open pages.

Figure 2F:
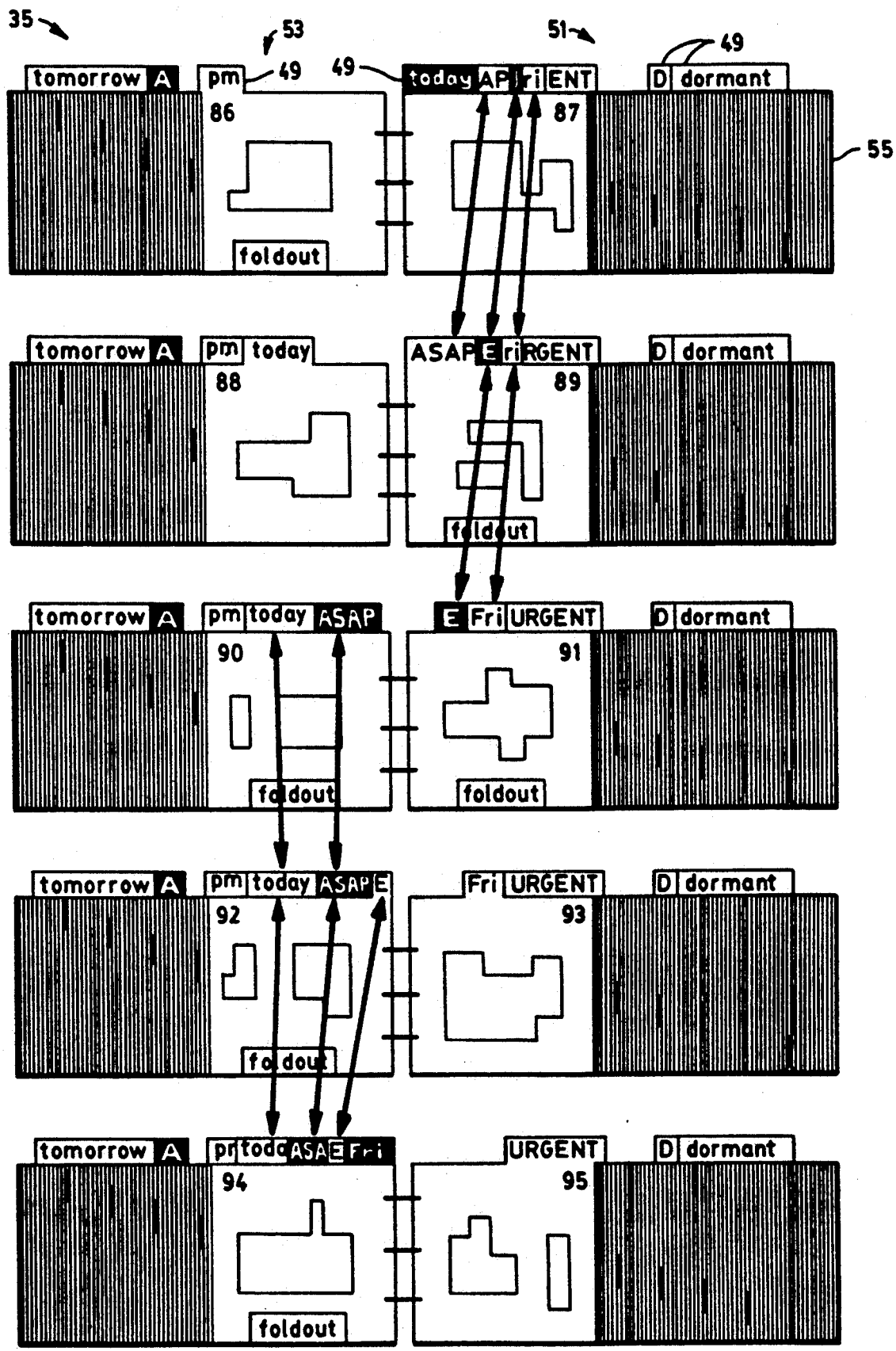

FIG. 2f illustrates the foregoing. The figure illustrates displayed screen views of the book representation 35 open to successive Pages 86–95 with tabs 49 automatically repositioned along the upper edge of respective pages. In each instance, the tabs 49 are repositioned for optimal visibility and non-occlusion of each other. The arrows indicate direction of sliding of a tab from one screen view to the next. For each tab, the extent of sliding along a page upper edge is constrained by the left and right side edges of the respective page. Reverse sides of tabs are shown with white text on dark background.

The following procedure describes placement of tabs on the right hand half 51 (FIG. 2f) of the open book representation 35, i.e. from end 55 of the book representation 35 back to the open pages (e.g. Page 87 of FIG. 2f). It is understood that the left hand half 53 (FIG. 2f) is treated symmetrically. As used herein, "placement" means the calculation of tab position along the upper edge of a page, which is done for each tab 49 in use before any of the actual redisplay of the book representation 35 with tabs 49 rearranged is performed. Preferably, for each half of the open book representation 35, the tab placement procedure calculates tab position on respective pages in order (serial or backward serial order) from an end most page (front cover end or back cover end) to the open pages, as described next.

Two parameters are maintained throughout the process:

(1) RIGHT—LOCK indicates the page which is closest to the open page of the right hand half 51 and which holds a tab flush to the right edge of the page. No tab coupled to a page nearer the open page can force the flush right tab farther right or change the calculated position of any tab coupled to a page succeeding the page of the flush right tab.

(2) PREV—LEFT indicates in absolute screen coordinates, the left edge of the most recently added tab, where order of adding tabs is from the tab coupled to a page closest to an end of the book representation to the tab coupled to an open page.

Assuming that there is at least one tab in the right hand half 51 of the open book representation 35, the process is started by finding the page closest to the end 55 of the book representation 35 with a tab 49. That tab 49 ("dormant" in FIG. 2f) is placed flush right on its page, and RIGHT—LOCK is set equal to that page's number. PREV—LEFT is set to the tab's left edge. Then for every tab in sequence backward to the open page of the book half 51 (i.e. "D", "URGENT", "Fri", "E", "ASAP", "today"), the following loop of instructions is applied:

If the tab can be placed flush right on its page without overlapping PREV—LEFT, then
  it is placed there,
  RIGHT—LOCK is reset to this page's number, and
  PREV—LEFT is set to this tab's left edge.
Else if the tab can be placed left of and abutting PREV—LEFT, and not extend farther left than its page's left edge, then:
  it is placed there and
  PREV—LEFT is set to this tab's left edge.
Else:
  the tab is placed flush left on its page,
  tabs between it and the tab of RIGHT—LOCK are repositioned so as to most equitably use the available space (ultimately leaving the new tab entirely visible but in general all tabs on succeeding pages to and including the page indicated by RIGHT—LOCK will be overlapped to some degree by tabs of previous pages), this is accomplished as follows:
  (a) the widths (desired space) of tabs on succeeding pages to and including the page of RIGHT—LOCK are summed;
  (b) the available space from the new tab's right edge to the right edge of the page of RIGHT—LOCK is computed;
  (c) the percentage that each tab can show (i.e. available space divided by sum of tab widths equals percent of each tab) is determined, and all tabs are positioned horizontally so that the calculated percentage of the horizontal span of each tab is displayed. Alternatively using the available space, some other algorithm for divvying up the space amongst the tabs is implemented, such as equal absolute amounts rather than percentage amounts. After all tabs involved have been positioned, if any tab extends to the left of the new tab's left edge (which can happen in the case of wide tabs), the overextending tab is truncated at this left edge.
  and PREV—LEFT is set to this last tab's (the tab flush left) left edge.

The foregoing illustrates the placement of tabs associated with the righthand open page and subsequent pages; a similar method is used to position contending tabs associated with the lefthand open page and previous pages, starting at the front of the book representation and working forward into the book to the open page.

Another feature of the present invention is the "soft ordering" of the book representation 35. That is, the ordering of the series of leaves 39 is changeable by the program 11 under the user's control. Generally, the leaves of the book representation 35 may be arranged page by page by the user's direct manipulation. Specifically to create the series of leaves 39, the user initially obtains units of various data and images in a screen view by common means, i.e. menu selection and the like. Employing the user interfacing discussed previously, the user orders and arranges the data units in a pile or stack as desired. Upon user command, such as through an icon interface, the program 11 establishes a book representation 35 having a series of leaves (pages) defined from the user defined stack of data units. Subsequent addition to (or deletion from) the book representation 35 involves user selection of a subject data unit (or page), selection of destination position in the book representation 35, and user directives to accomplish the task. Data structures and software for accomplishing such handling of data units is described in U.S. patent application Ser. Nos. 245,419 and 200,091 herein incorporated by reference. Program 11 is responsive by assigning correct page numbers to added pages and renumbering pages accordingly (in the case of deletion or addition of pages to the book representation 35).

Figure 2G:
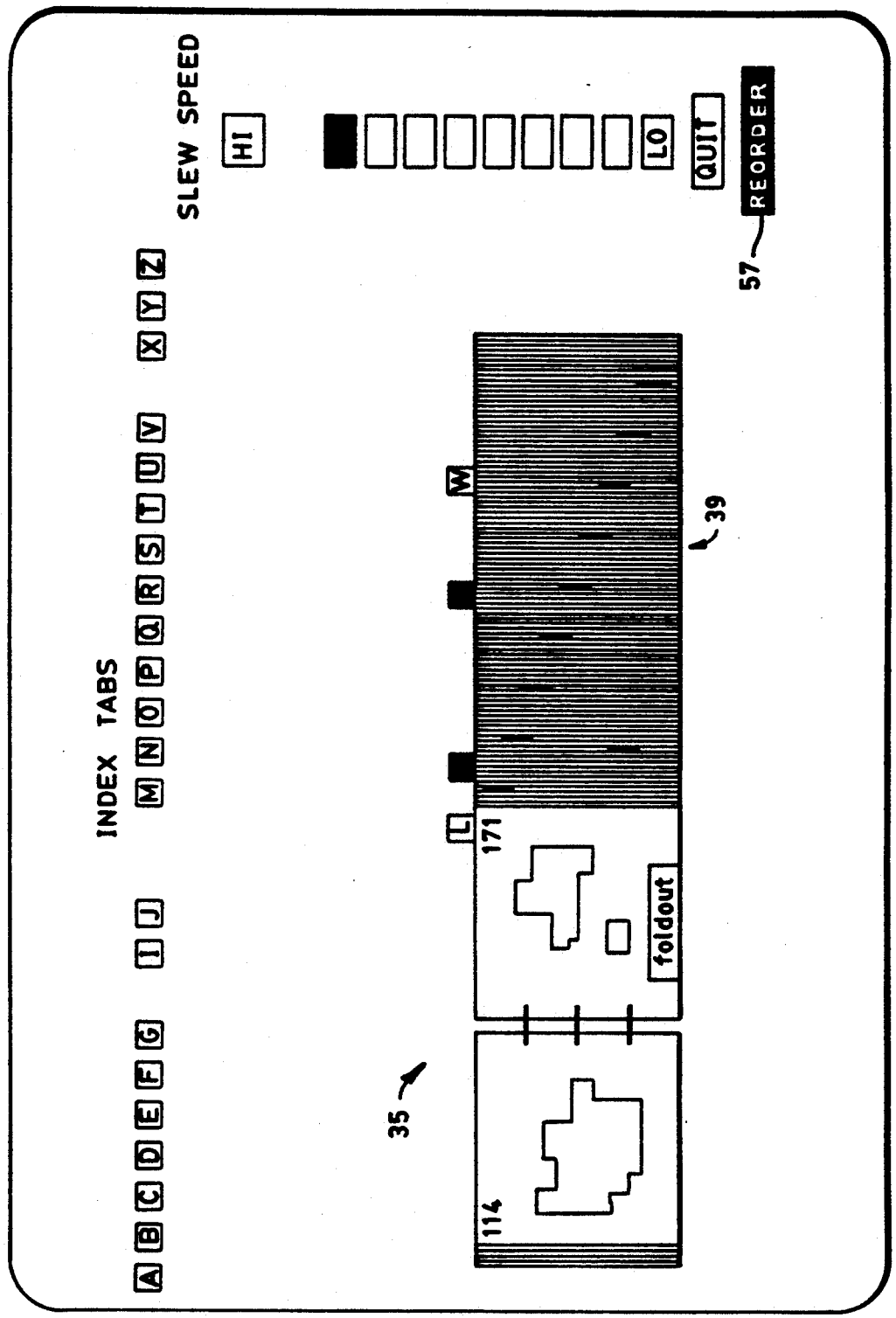

Alternatively, ordering of leaves 39 of the book representation 35 (at creation of the book representation or subsequent thereto) may be done automatically by program 11. In particular, user commands through the keyboard 27 or other input devices together with a graphic interface (e.g. menus or icons) may be employed as illustrated in FIG. 2g. A reorder button (icon) 57 is selected through the above described user interface. Program 11 responds by reordering the serial position of leaves 39 of the book representation 35 according to a predetermined ordering or a user specified ordering such as numerical, alphabetical of corresponding data, author, and the like. FIG. 2g shows a reordering in which the original page numbers are retained with the respective page data, but position of the leaves and, hence, pages are obviously reordered as Pages 114 and 171 are now shown facing each other near the front cover 37 of the book representation 35.

In the one embodiment, the invention program 11 employs a random number generator such that when the reorder icon 57 is selected by the user, the series of leaves 39 is reordered in random generated calculated order. In preferred embodiments, program 11 employs information associated with individual pages as stored in memory, such as author, size, date of creation, etc, to reorder the series of leaves 39. Various routines common in the art may be employed to accomplish such reorderings.

Figure 2H:
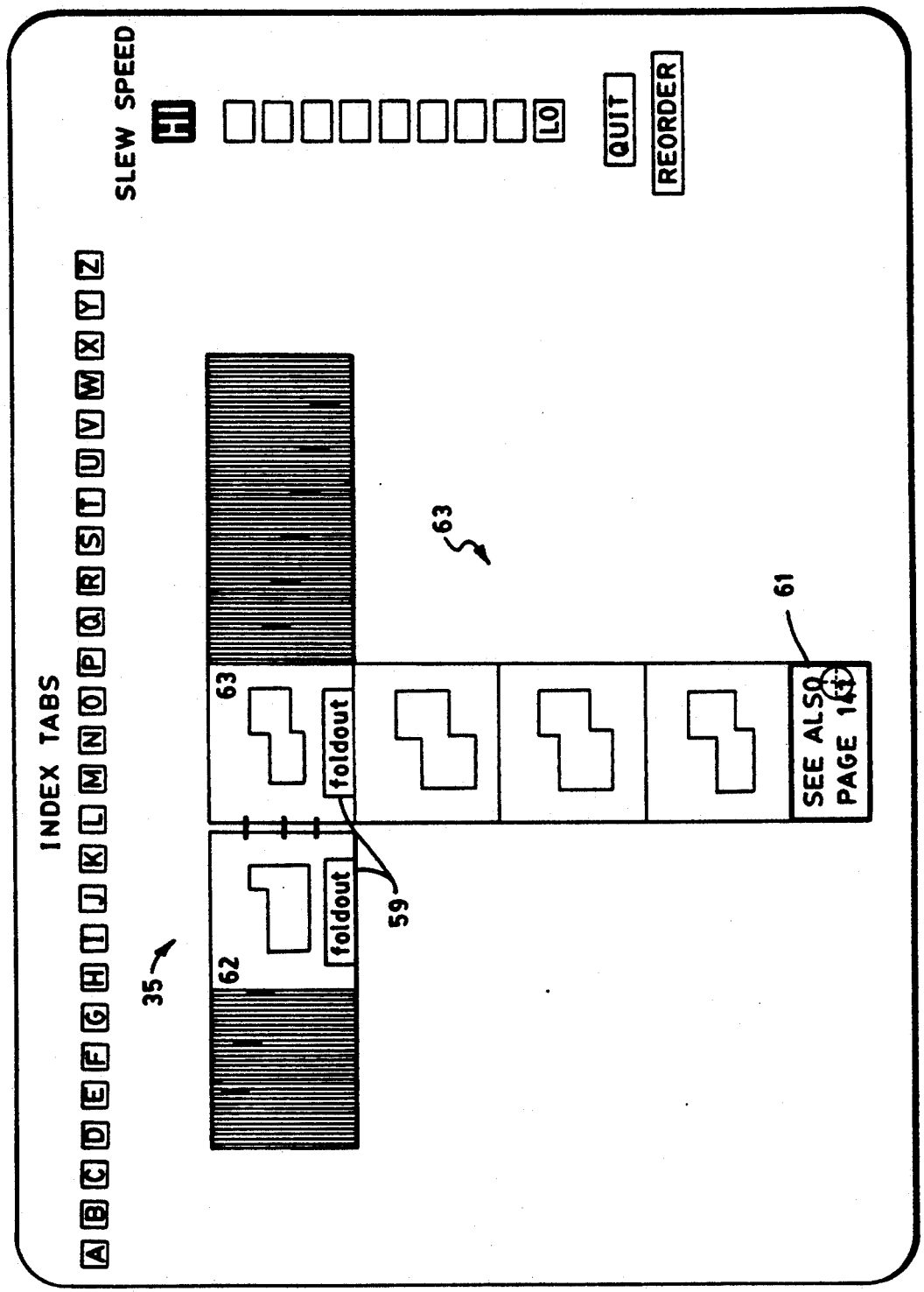

Additional information that is in some way related to a particular page of the book representation 35 may be caused to appear by the user selecting an appropriate portion of that page. FIG. 2h illustrates a portion 59 labelled "foldout" on a page. Upon user selection of this foldout portion 59, the invention program 11 causes additional data 63 to appear. For example, if the page bearing a "foldout" portion 59 represents a cover page of a document, then the additional data 63 which appears may represent the individual pages of the document. If the "foldout" bearing page holds menu items, then the additional data 63 might contain descriptive information about the menu items. Clearly the additional data 63 may be used for a variety of purpose with respect to the "foldout" bearing page associated therewith.

Further, a cross-reference member 61 such as the one saying "See also Page 141" in FIG. 2h may also appear either on the initial page or as shown within the foldout data 63. The cross-reference member 61 may be activated by user selection thereof which in turn causes the invention program 11 to open the book representation 35 to the referenced page. Methods known in the art for accomplishing such cross-referencing are used.

Fold-out data 63 may be left visible as the book representation 35 flips to other pages or the data 63 may be caused to disappear (i.e. "fold back in") when page flipping resumes. The foldout data 63 may be more elaborate than shown in FIG. 2h, expanding as required like a road map to cover much more of the screen view in order to display all of the related information.

Figure 2I:
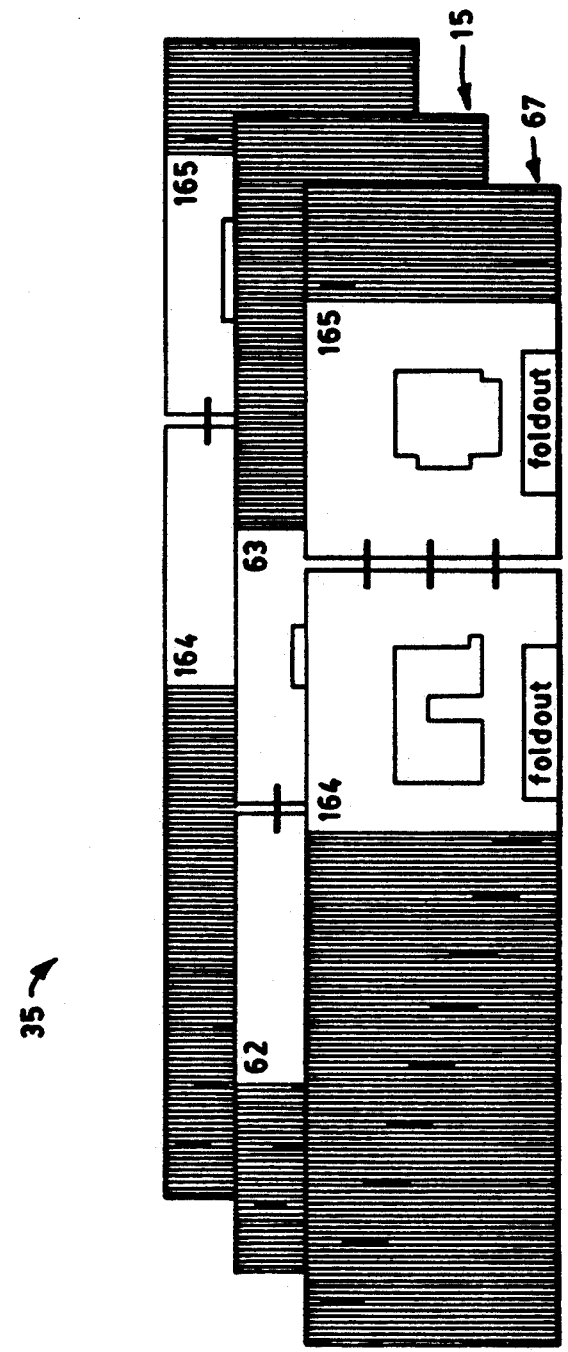

Another item that folds or drops out of a selected page of the book representation 35 is shown in FIG. 2i. Here, another complete book representation 65 has appeared from one page in the original book representation 35, furthermore, a third book representation 67 has appeared from the second book representation 65. Thus, a hierarchical structure representing, for example, a computer directory structure of sub-directories (fold out book representations 65, 67) and files (leaves of a fold out book representation) can be explored using essentially the same visual metaphor. With appropriate management of screen space, more than one path downward in such a hierarchical structure may be exhibited, and parts of the structure can be left displayed as book representations of higher levels flip open to other pages.

In a preferred embodiment, the pages to which the book representation 35 (FIGS. 2a-2i) is opened are each 128 pixels wide. The stripes or respective edges of the leaves 39 of the book representation are each three pixels wide (2 pixel width for the white portion and 1 pixel width for the black edge delineation portion). For a 1K or 1024 pixel wide screen, up to about 500 pages on the front and back of 250 leaves with a three pixel wide leaf edge always exposed can be accommodated in the manner described above in FIGS. 2a-2i.

For book representations with more than 250 leaves the embodiment of FIGS. 3a-3e may be employed. In that embodiment a computer simulated book of 1200 pages is provided by the present invention on a 1024 pixel wide display unit screen. The largest book representation able to be typically printed out across an 8½ inch wide piece of paper has 870 pages (435 leaves).

Such large books are useful for holding various information including randomly ordered material such as from an In-box or electronic mailbox, partially ordered items such as entries of an address book, items in flux such as a computer directory, work-in-progress or large document under editing, and elements intrinsically difficult to order such as real estate photos and mug shots.

Figure 3A:
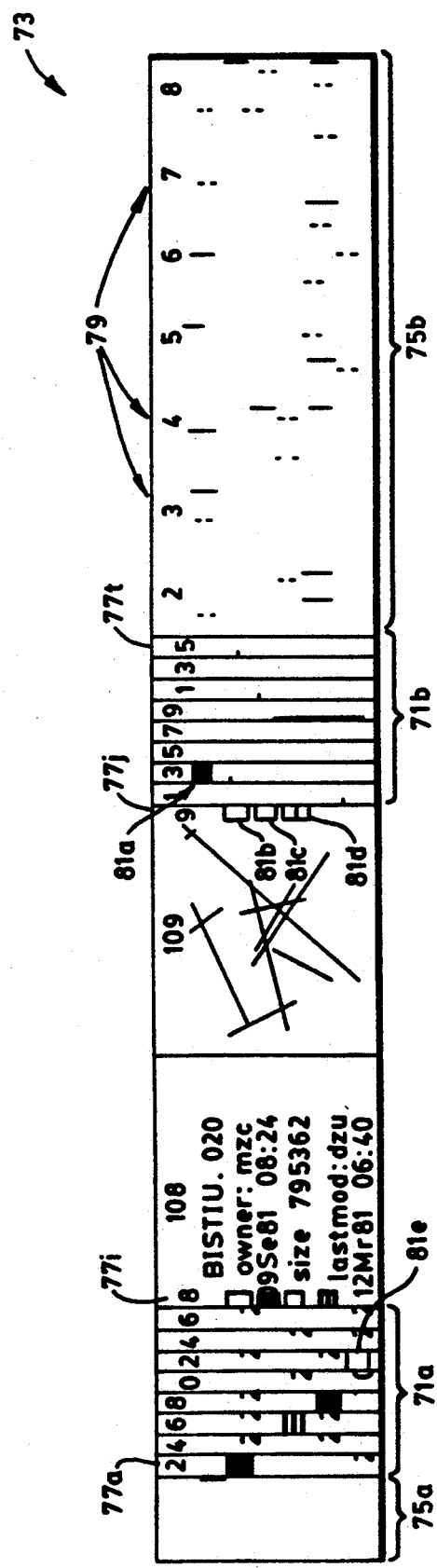
FIGS. 3a-3e are illustrations of screen views from another embodiment of the present invention.

In the embodiment of FIGS. 3a-3e, the leaves of the book representation are ordered in a series and positioned aligned and overlapping one another such that an edge of each leaf is always exposed as described for the embodiment of FIGS. 2a-2i. However, instead of the same amount of exposed edge for each leaf in the book representation as in the embodiment of FIGS. 2a-2i, the embodiment of FIGS. 3a-3e provides for a wider exposed portion of leaves neighboring the pages to which the book representation is currently open. FIG. 3a illustrates this by showing the book representation 73 open to Pages 108 and 109. The eight leaves 71a preceding Page 108 have respective 8 pixel wide edges exposed, and the eight leaves 71b succeeding Page 109 similarly have respective 8 pixel wide edges exposed. The remaining leaves 75 of the book representation 73 each have a 1 pixel wide edge exposed. Each 1 pixel wide edge is illustrated as a thin vertical line having alternating black and white pixels. Successive edges are of alternating phases of the black and white pixel pattern. To that end, the areas covered by the remaining leaves 75 have a fine checkerboard pattern which provides certain advantages in displaying the book representation 73 from state to state.

Thus, the three basic regions of the displayed book representation 73 of FIGS. 3a-3e are (i) the open pages, consisting of, for example, an image on the front facing (right hand side) page and documentation about the image on the back facing (left hand side) page, (ii) the neighboring leaf edges 71 spread relatively wide enough to show various indicia described later, and (iii) remote leaves 75 that form a fine checkerboard of black and white alternating line segments.

As illustrated in FIG. 3a, each page has a respective page number which appears centered on the page when the book representation 73 is open to that page. In addition, the low digit of a respective page number appears in the outer corner 77 of the open pages and corresponding pages of the neighboring leaves 71. For each group of ten pages, the height of the low digit numeral in the corner 77 alternates to facilitate interpretation of the page number. The page numbers and low digit numbers may be handled as part of the bitmap image of a page, or alternatively the numbers may be computed for each page in the display of the book representation 73 as described later.

To further aid navigation in the book representation 73, thumb tabs of the previous embodiment appear as numeric indications 79 in the embodiment of FIGS. 3a-3e. The illustrated numeric indications 79 (FIG. 3a) mark every hundredth page (or every 50th leaf) of the book representation 73. The numeric indications 79 are positioned along the top portion of the leaf edges in the remote leaves 75 region of the book representation 73. Thus to open the book representation 73 to Pages 108 and 109, a user selects a leaf edge between numeric indications "1" and "2" (closer to the "1" indicating Page 100) and selects a leaf edge bearing a corner digit 77 of "8" or "9" in the first set of corner digits (for Pages 100-109) following the "1" numeric indicator.

Another feature of the embodiment of FIGS. 3a-3e are the tabs 81 which are user selectable at different predefined positions along the outer (exposed) edge of a page. Generally the tabs 81 are rectangular in shape and each tab may take on three different patterns such as white, black and striped as illustrated in FIG. 3a. For each page, there may be one tab at each of the predefined positions, different tabs having different or the same patterns.

FIG. 3a illustrates the five different tab positions on a page selectable by a user in a preferred embodiment. A first portion is illustrated by the black tab 81a near the upper corner 77 of Page 113 of the book representation 73 of FIG. 3a. The second, third and fourth tab positions are illustrated by tabs 81b, 81c and 81d on open Page 109 in FIG. 3a. And the fifth tab position is illustrated by the white tab 81e near the lower corner of Page 102 in FIG. 3a. It is understood that other positions along the periphery of a page may be used for tabs 81.

Also in the preferred embodiment, the user selects a tab 81 by positioning the cursor near one of the five tab positions along the outer edge of an open page and operating the input device with the cursor at that position. Upon operation of the input device, the program 11 provides a tab 81 at the selected position in one of the three patterns. Upon the user reselecting the tab 81 at that position, the tab 81 changes to the second pattern; and upon a third selection of the tab at that position the tab 81 takes on the third pattern. Upon a fourth selection of the tab 81 at that position, the tab is not displayed or is effectively removed. The user may thus cycle through the tab patterns including removal of the tab 81 at each of the tab positions along the page edge to provide the desired tabs 81 on the open page.

The tabs 81 are preferably 8 pixels wide such that they appear in full on pages corresponding to neighboring leaves 71 of the open pages of the book representation 73. On pages of the remote leaves 75, the tabs 81 appear as single pixel wide line segments, each the length of a tab and having a solid black, solid white or black and white stripe pattern. Hence, the different patterns of the tabs 81 are distinguishable in either the remote pages or the neighboring pages of the book representation 73 as can be seen in the illustrations of FIGS. 3a-3e.

Figure 3B:
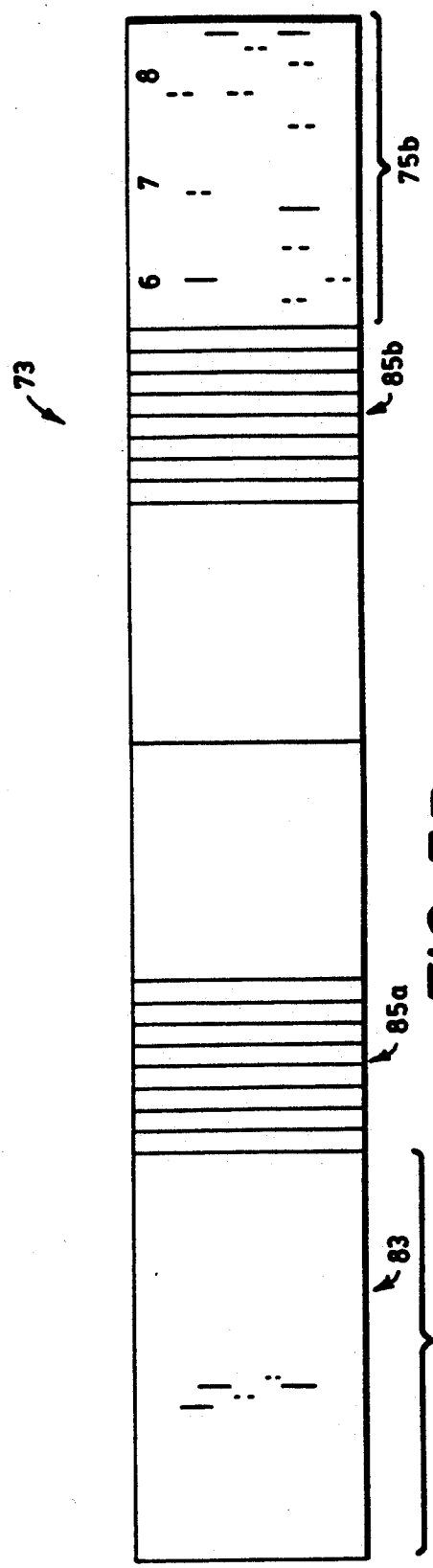

The user interface and program 11 response for opening of the book representation 73 to a desired page and flipping through pages of the book is as described above for the embodiment of FIGS. 2a-2i. Also, in the embodiment of FIGS. 3a-3e, depending on the flipping rate chosen by the user, different levels of detail are provided on the pages to which the book representation 73 is momentarily opened during flipping. In particular, in a fast rate of flipping, each intermediate page or turned leaf of the book representation 73 appears as a blank open page when the book representation 73 is momentarily open to that page. And thereafter that leaf appears as a blank edge (solid stripe or wide white stripe). Such is illustrated in FIG. 3b where the leaves turned immediately after Pages 108, 109 of the book representation 73 of FIG. 3a are shown as solid dark lines 83 and the later turned leaves are shown as white (blank) neighboring leaf edges 85. The book representation 73 of FIG. 3b is momentarily open to Pages 500 and 501 shown as blank open pages without page numbers and data images. Note that corner digits, tabs, hundreds indicators and other indicia are not displayed on the involved leaves/pages 83, 85 (FIG. 3b) during the fast rate of page turning.

Figure 3C:
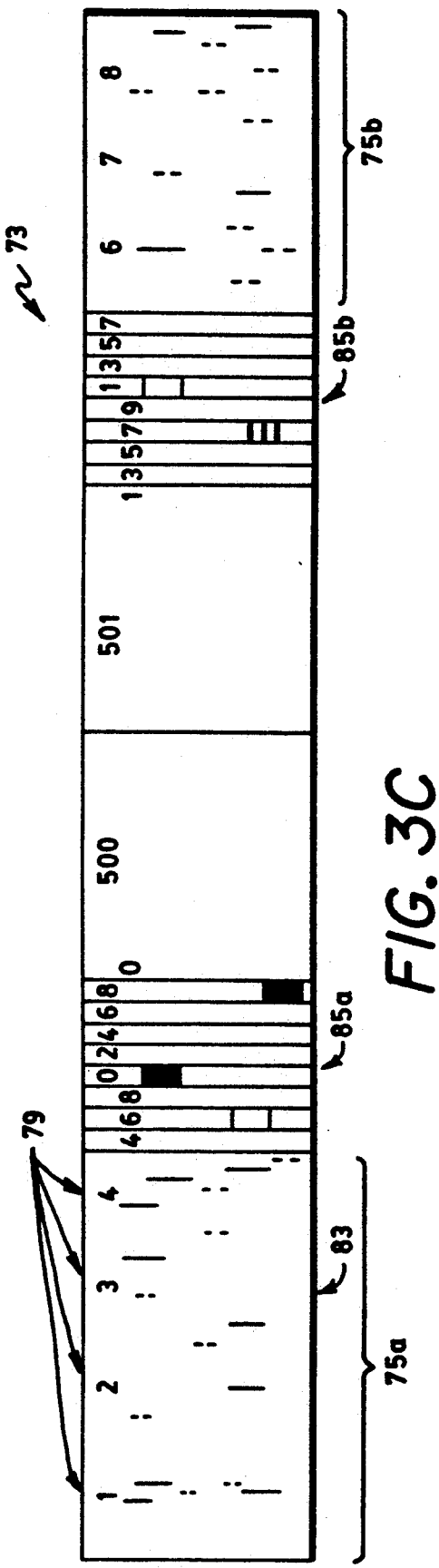

In a medium rate of flipping, only the page numbers, corner digits (i.e. low digit of the page numbers in the corner of the pages) and tabs are displayed on the involved leaves/pages during the flipping as illustrated in FIG. 3c. That is, the book representation 73 of FIG. 3c is the analog of the book representation of FIG. 3b but at a medium rate of flipping. Hence, the single pixel wide edge of tabs and hundreds indicators 79 are drawn in for the first set of turned leaves at 83. And corner digits, tab and page numbers are drawn in for the later turned pages at 85 and the open pages. Note the open pages and neighboring leaf edges 85 are not displayed with respective data/images or portions thereof as displayed in the open state of the book representation 73 in FIG. 3a. Also, program 11 may be caused to pause for a predetermined length of time between leaves.

Figure 3D:
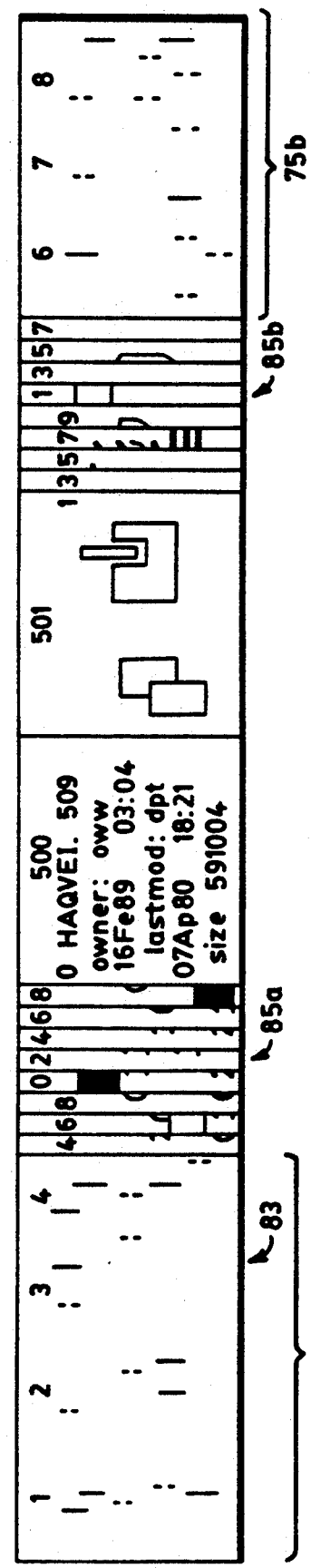
Figures 3E, 3F:
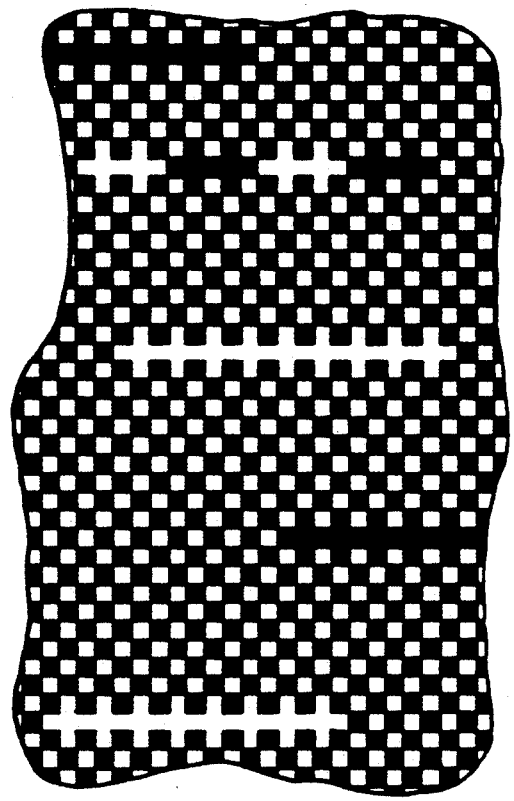

In a slow rate of flipping, all the detail of FIG. 3c as well as the data/images on the open pages and portions of respective data/images on neighboring leaf edges 85 are displayed as illustrated in FIG. 3d. Further, program 11 may utilize a longer pause time than that used for the medium rate of flipping. Flipping continues, stops or changes direction according to the user interface described above for the embodiment of FIGS. 2a-2i. For any flipping rate, upon stopping at a user selected page, for example Pages 774, 775, the program 11 provides all details of the book representation 73 as illustrated in FIG. 3e.

In order to avoid flicker of the display throughout the embodiment of FIGS. 3a-3c, program 11 redraws subject portions of the book representation 73 in an off-screen staging buffer 19 (FIG. 1). Preferably the staging buffer is a portion of a high speed random access memory. When the subject book portion is ready in the staging buffer 19, the area of staging buffer 19 holding the subject portion is transferred to the screen bitmap 17 (FIG. 1). The redrawn portion is transferred one pixel to the right or left of where the previous transfer went, depending on the direction of flipping (or to the same place in case it is a tab state that has changed).

For example, when flipping to a pair of pages succeeding (preceding) the current pair of open pages, say for example from Pages 108-109 to Pages 110-111 (106-107) of FIG. 3a, program 11 shifts the white background area of FIG. 3a (i.e. the area covered by the open pages plus the neighboring pages 71) one byte to the left (right) in the staging buffer 19 in RAM. Program 11 maintains page numbers, corner digits, tabs and peripheral material of each page except the left most (right most) neighboring page of the shifted area. Program 11 next fetches images for destination Pages 110-111 (106-107) from a disk 23 (FIG. 1) or other memory storage of images or a cache. Program 11 then inserts the fetched images in the appropriate positions in the staging buffer 19 in RAM. Program 11 then fetches from disk or cache into working buffer 21 the page image of the now added right most (left most) neighboring page, i.e. the page whose outer edge is newly visible with extra width. Program 11 then adds to this page image tabs and corner digits. A byte wide edge of the page image in the working buffer 21 is finally transferred to the pertinent position in the staging buffer 19 in RAM.

To provide display of the successive view of the book representation from being opened to Pages 108-109 to being opened to Pages 110-111 (106-107), program 11 block transfers the contents of the RAM to the screen bitmap 17. The block transfer is to a bitmap position that is one pixel to the right (left) of the previous position of the subject white background area (i.e. the area covered by the open pages plus neighboring Pages 71). This one pixel shifted block transfer causes the leftmost (rightmost) exposed extra wide edge of the starting pages to be changed to a single pixel wide edge by leaving for display the leftmost (rightmost) column of pixels of the page edge. Additionally, white tabs 81 in the preferred embodiment have an outer edge formed of a column of white pixels such that display of white tabs on a newly made remote leaf page is automatically provided with the one pixel shifted block transfer, similar to the display of remote black or striped tabs.

After the block transfer to bitmap 17, program 11 updates the screen view by adding hundreds indicators where now needed.

Further, in order to minimize disk fetches, picture update and byte alignment problems such as shifting, masking, ORing, etc., it is important that an integral number of bytes in width are employed for: the area covered by each open page of the book representation 73 and the area covered by each neighboring leaf edge (i.e. the edges with extra width viewable). In the preferred embodiment, each open page covers a 16 byte wide area, one set of neighboring leaf edges collectively covers 8 bytes, and each wide leaf edge covers 1 byte.

The preferred embodiment uses the following to further speed the fast rate of page flipping. Once the staging buffer 19 has been cleared by "fetching" blank pages into it, repositioning of the blank pages in the bitmap 17 is done two pixels at a time. This leaves behind the appropriate matching checkerboard pattern for remote leaves 75 while making no changes to the staging buffer 19 in RAM. When within eight leaf flips of the destination (i.e. desired open pages), proper page image/data fetches (e.g. from disk 23) with page numbers, corner digits and pertinent tab construction are performed for each page of the close eight leaves. This provides that the final display in the staging buffer 19 is appropriate and complete. Since hundreds indicators and tabs are omitted during fast flipping, a recovery procedure is utilized, with display of the final staging buffer, to provide hundreds indicators and edges of tabs of the remote turned leaves 83.

Also, a cache may be employed to hold a number of page images for pages/leaves adjacent to or neighboring the current book opening. This avoids in particular the double fetching of each page image/data, once for a bytewide edge portion to form the neighboring leaf edge and eight leaf flips later for its full image.

It is understood that the features of the embodiment of FIGS. 2a-2i may be implemented as alternative or additional features of the embodiment of FIGS. 3a-3e. Included are tabs or labels removably attachable to the top side of pages. The tabs could be of fixed or of various widths and could include the option of user specified content. The tabs could be self adjusting to positions for maximum viewing. The leaves/pages may be reorderable, removable and/or insertable. There may be foldouts and active imbedded cross-references. There might be a hierarchical implementation whereby an entire book representation could "drop out" of a page and open to a second book representation overlapping the first book representation, and from the second book representation might come a third book representation, and so on. Such an implementation might serve for displaying and browsing through a computer structure of directories, sub-directories and files.

In either or any embodiment of the present invention, another procedure of the program 11 may provide the enlarged display of page information and/or images of a page. Such enlarged display upon user selection at command is discussed in U.S. patent application Ser. Nos. 245,419 and 200,091 mentioned previously.

In addition to a user pointing to a page to select the page and automatic flipping through a series of pages, alternative or additional means may be employed for searching through pages of the book representation. For example, the user may provide a query using Boolean functions of properties of page data or words in context etc. Using the search query, the additional means searches from the current open pages for the next page which holds data satisfying the request. Upon satisfying the request, the additional means flips the book representation open to a page satisfying the query. Additional, distinctive tabs might be made to associate with and appear automatically on pages satisfying a search query.

Figure 4:
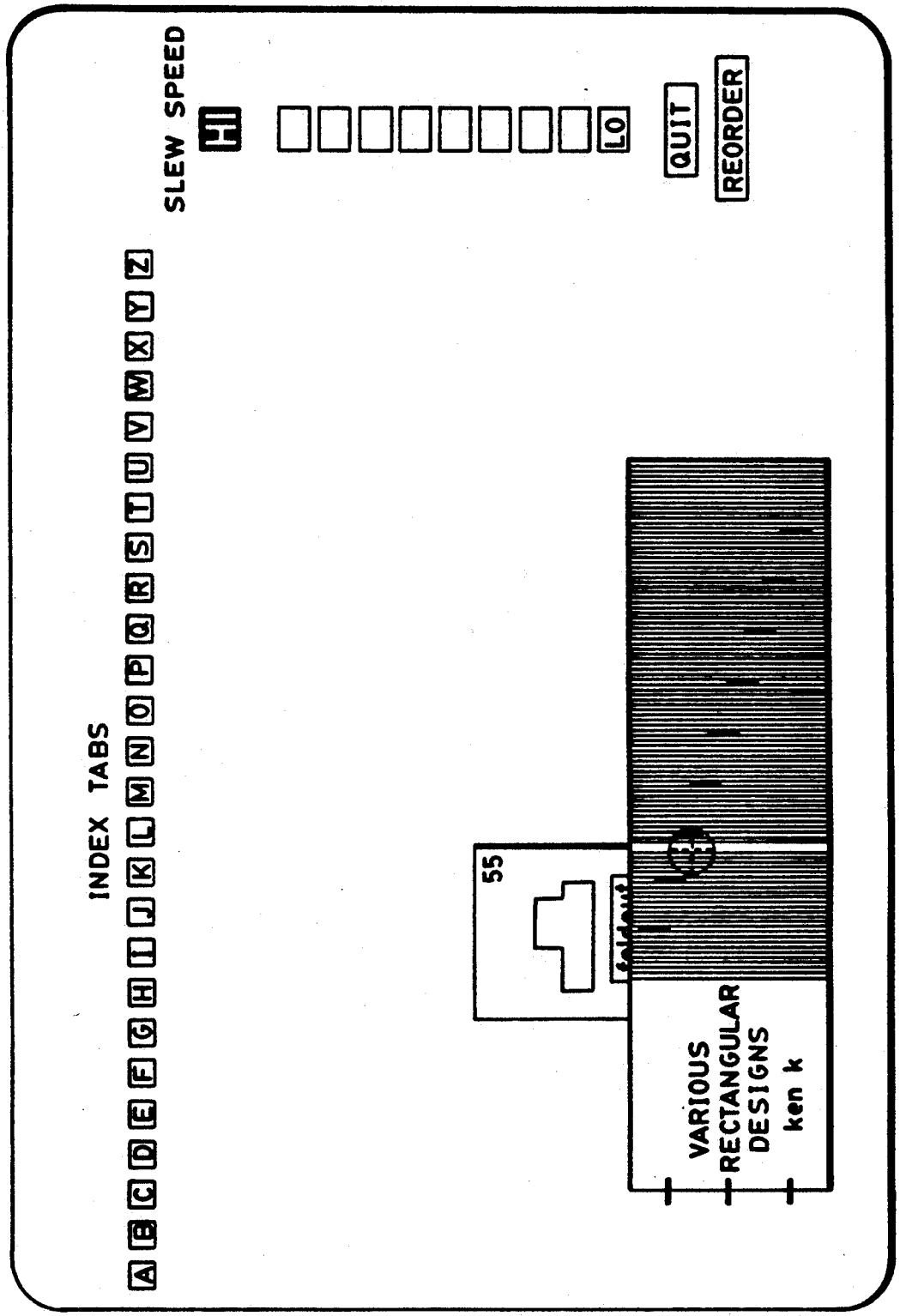
FIG. 4 is an illustration of a screen view of an alternative embodiment of the present invention.

Other functions and features for the book representation of the present invention in addition to the above features and various combinations thereof are with the preview of one skilled in the art. Alternative appearances of the book representation may also be utilized. For example, if leaves are one-sided, the open page (leaf side) may appear as if it were slid outward from the succession of leaves so as to be visible, as illustrated in FIG. 4. Variations of this arrangement may be made for the display of two-sided leaves, for example, by showing two such pages simultaneously, or by showing frontside and backside pages alternately in natural sequence. Hence, it is understood that the functions, features and appearances herein described or mentioned are by way of illustration and not limitation.

The preferred software program for the book representation of the present invention is described next. The program 11 utilizes a tabular data structure 87 illustrated in FIG. 6 that maps so-called "book division" to a particular leaf side including page image, page number and tabs to be displayed with the page image. "Book division" is the serial position of a book opening. So the book representation in the closed state with the front cover in full view has a book division of zero. The book representation open to the frontside of the leaf succeeding the cover and the cover leaf backside has a book division of one. A book representation open to a frontside of leaf n (where n is the number of leaves from and including the cover leaf) has a book division of $n-1$, and the book representation open to a backside of leaf n has a book division of n.

In the case of a book representation with the frontside of the leaf succeeding the cover leaf indicated as Page 1 and each leaf side of the following leaves numbered in natural order to provide succeeding pages, indicated Page 1 is at book division 1, facing Pages 2 and 3 are at book division 2, facing Pages 4 and 5 are at book division 3 and so forth. Thus for sequentially (natural) ordered pages, book division number=(page number $+2) \div 2$, rounded down to the nearest integer. And the front cover (i.e. front side of the first leaf) is at book division 0, and the back cover (backside of the last leaf n) is at book division n. Program 11 uses the foregoing to obtain book division number of desired subject pages and thereafter uses the book division number as an index into table 87.

Figure 6:
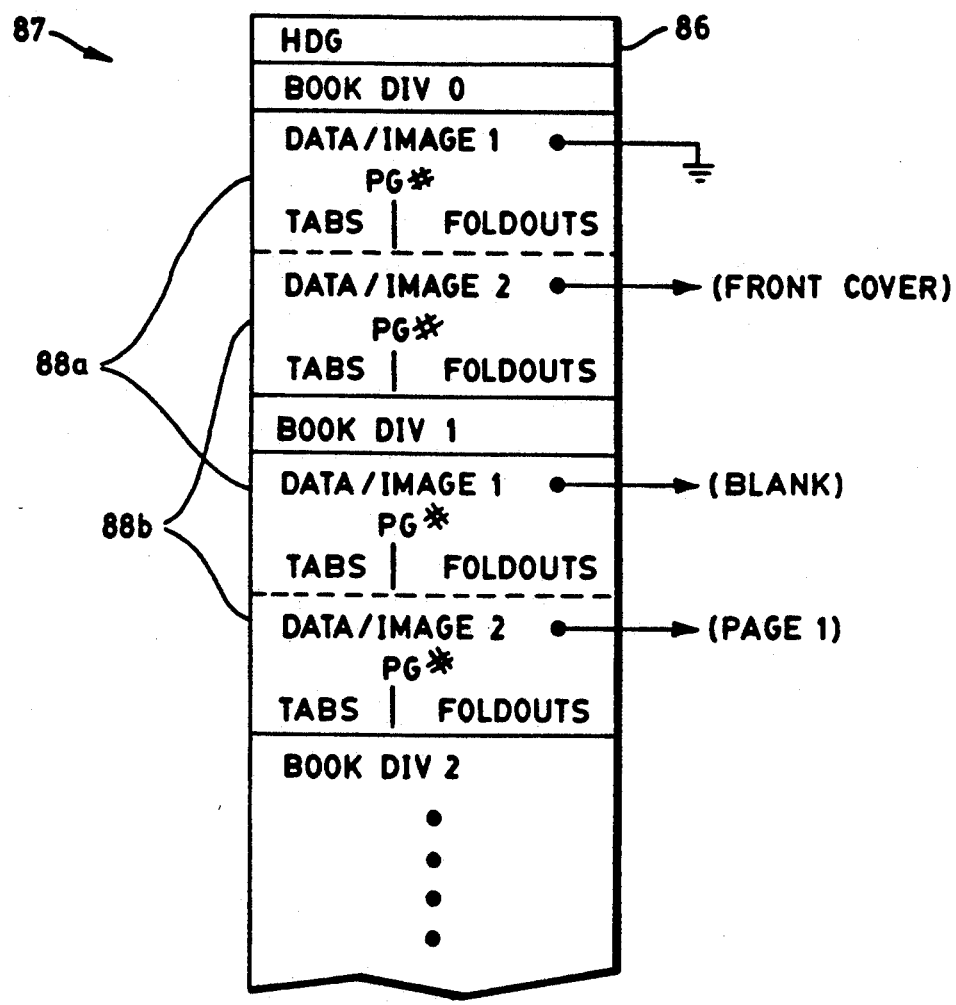
FIG. 6 is a schematic diagram of a data structure employed in the software of FIGS. 5a-5b.

For each book division index in table 87, there are two entries 88a, 88b. The first entry 88a is preferably for the back facing (left hand side) page of the corresponding book opening and the second entry is for the front facing (right hand side) page. Each entry 88 provides a pointer to data or image to be displayed on the corresponding page as illustrated in FIG. 6 by arrows. The arrow of the first entry 88a of book division 0 is illustrated as a null pointer indicating that there is no leaf backside facing the cover (i.e. first leaf front side). Alternatively, a first entry 88a of book division 0 may be omitted to save memory space.

The second entry 88b of book division 0 provides data/image of the front cover of the book representation. The first entry 88a of book division 1 provides a blank backside of the cover leaf which faces the indicated Page 1 on the frontside of the second leaf of the book representation in table 87. Thus as illustrated, table 87 provides the book representation of the above example having natural ordered numbered pages beginning with the leaf succeeding the cover leaf.

Each entry 88 of table 87 also provides the page numeral to be displayed with the page data/image. In one embodiment, the page number does not change such that the corresponding page data/image is always displayed with the indicated page number. To that end, in the case of reordering pages of the book representation, whole entries 88 of table 87 are switched among book division indexes and the page image/data and the indicated page number are displayed on a different leaf side of the book representation than the original leaf side of the subject page information. Subsequently, program 11 does not determine book division by the above equation for natural numerically ordered pages but by searching table 87 for the page number of the desired page information.

Further, each entry 88 provides an indication of tabs to be displayed on a corresponding page of the book representation. For the embodiment of FIGS. 2a-2i, the tab indication includes a pointer to a tab in a file of tab images and an indication of position along the top edge of a page at which the tab is displayed. Also, the indication provides display information of each side (frontside, backside) of the tab. In the embodiment of FIGS. 3a-3e, the tab indication includes indications of position and pattern of activated tabs of a corresponding page.

In addition, there is a tab-to-page table indexed by tab designation. For a given tab designation the tab-to-page table enables the program 11 to determine to which page, if any, the tab is attached. The tab-to-page table is utilized in program interpretation of user actions involving tabs.

Also included in each entry 88 of table 87 (FIG. 6) is an indication of foldouts and cross-references related to the entry data/images. The foldout indication also flags two states of the corresponding page, actual display of foldout information and display of foldout icon unactivated.

During formation of the book representation, a program procedure completes table 87. That is, using input devices and user interface given, a user specifies desired page information and desired serial order of the page information. Upon user command to form a book representation from the user specifications, a program procedure establishes an entry in table 87 for each user specified page in specified serial order. That is, the information pertaining to the frontside of the user specified first leaf of the series is used to complete the first variable entry of table 87 (i.e. entry 88b of Book Division 0). The information pertaining to the backside of the user specified first leaf is used to complete table entry 88a of Book Division 1, and so on.

A sub-procedure similarly provides references and links to fold-out information in table 87. Subsequent application access of the book representation is then supported by table 87 and disk files or other memory holding user specified page information (data/images). A heading 86 of the book representation table 87 contains, among other details, identification of the corresponding book representations and the disk files and memory addresses needed to support the book representation.

In the case of user insertion or removal of leaves of the book representation, a program procedure expands or collapses, respectively, table 87. Common means and methods for accomplishing such expansion or collapsing are employed and include the task of updating table 87 to reflect the desired series of leaves which currently form the book representation. The table update provides new page numbers as well as maintains tab information of respective page images.

In the preferred embodiment the program procedure accomplishes the insertion or removal of one leaf and is executable a plurality of times for the repeated removable and reinsertion of leaves to reorder the series of leaves as discussed later. Upon completion of the program procedure, program 11 or a sub-program updates display of the book representation by moving and/or adding/deleting pertinent image parts, by providing new page numbers and corner digit indications of renumbered pages, and by adjusting hundredth indications and/or thumb tabs. Recalculation and update of corner digits, hundredth indications and/or thumb tabs is by counting entries 88 of table 87 or similar counting schemes.

At the end of a session, the state of the book representation may be saved so that the next session may begin where the previous one ended. In particular, tabs may be left attached to desired pages.

Figure 5A:
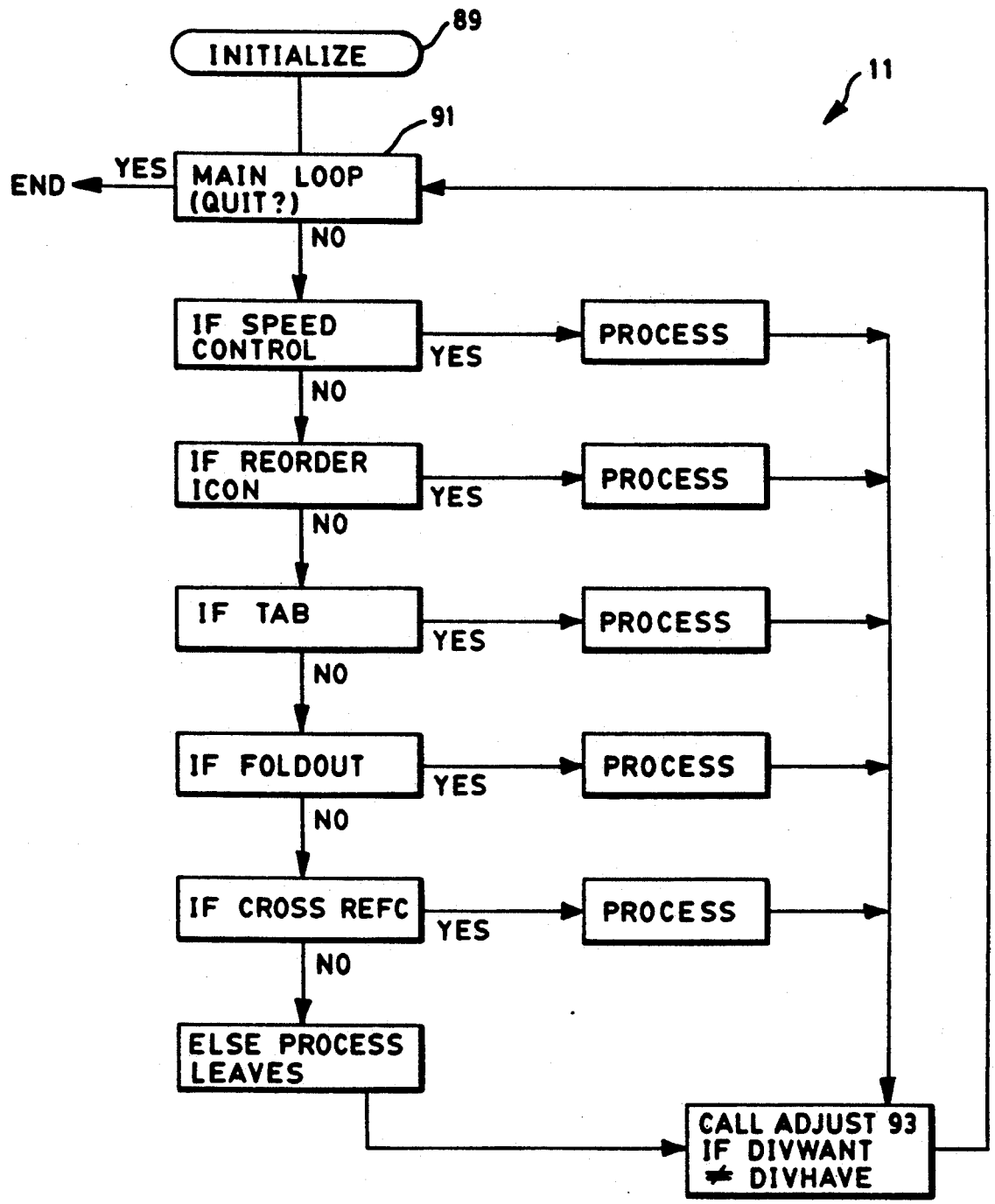
FIGS. 5a-5b are flow diagrams of the software program that supports embodiments of the present invention.

Referring to FIG. 5a, upon user log-on and access of the invention program 11, program initialization 89 occurs. Initialization 89 involves opening the disk file 23 of FIG. 1 containing page images (such as the stamp file of U.S. application Ser. Nos. 245,419 and 200,091), defining graphics elements (e.g. available tabs 49 of FIGS. 2a-2i, reorder icon 57, slew speed icon 47 and other menuing elements), fetching or constructing a book defining table such as table 87 illustrated in FIG. 6, and initializing various parameters (e.g. flipping rate, a pause time per different intermediate flipping rates, divwant—the desired book division, and divhave—the current book division). In the preferred embodiment, divwant and divhave are initially set to the current book opening. In the embodiments of FIGS. 2a-2i, initialization 89 sets all 26 tabs 49 to be available.

Initialization 89 also initializes the display unit screen to show the book representation in a particular state (e.g. closed or open to certain pages. To accomplish this, initialization 89 declares the current book division (divhave) to be 100 for example and then requests book division 0 (divwant set to 0). To satisfy the request, initialization 89 calls subroutine adjust 93 (described later) which turns one leaf in the book representation in the direction of the requested book division i.e. the targeted divwant book opening, and which adjusts the screen view bitmap 17 accordingly. Initialization 89 calls subroutine adjust 93 as many times as needed to satisfy the request of book division 0 (i.e. the book representation in its closed state). To provide display of neighboring leaves and peripheral portions of page information thereof in the embodiments of FIGS. 3a–3e, initialization 89 next requests book division 3 for example (resets divwant to 3) and calls subroutine adjust 93 accordingly. To that end, initialization 89 provides initial display of the book representation open to certain pages.

Subsequent to initialization, program 11 displays a cursor in the screen view in correspondence with user movement of the input device. Program 11 cycles through a main loop 91 until program 11 detects user activation of the "quit" icon or a sign-off signal.

Main loop 91 begins by testing whether a slew speed selection icon (control button) is activated by the user (i.e. the user has positioned the cursor on the icon and is operating stylus tip or the mouse button). If so, program 11 checks if the user selected new speed is different from the current setting of the flipping rate parameter. If so, program 11 sets the parameter value and adjusts the pause time accordingly. Program 11 also updates the screen view by reverse videoing the newly selected speed icon and reverting previously illuminated speed icon to normal display thereof.

Otherwise main loop 91 tests for user activation of the "reorder button". In the case of a predetermined reordering, for every other activation of the reorder button, program 11 provides the predetermined reordering of leaf sides of the book representation as previously described. Program 11 updates table 87 accordingly such that table entries reflect the current ordering of the leaves of the book representation. For the other times that the reorder button is reactivated, program 11 provides normal (sequential) ordering of the leaf sides. This is accomplished by sorting the table entries 88 according to page number and respectively reassigning book division in natural serial order.

In the case of plural predetermined orderings, program 11 provides a menu listing the different orderings upon activation of the reordered button. Upon user selection of one of the orderings from the menu, program 11 provides the user selected reordering of leaf sides by common sort routines, (e.g. alphabetical by author data in respective table entries 88 of leaf sides, chronological by date data in the table entries 88, and so on). Program 11 also thereafter updates table 87 such that the table entries 88 reflect the current ordering of leaves of the book representation. Preferably, one of the menu selections returns ordering to normal (sequential ordering of leafsides. Program 11 accomplishes the return by common methods as known in the art.

In any case, program 11 sets a parameter or flag to indicate which ordering (normal or predetermined reordering) is the current ordering. Program 11 also displays the reorder button in reverse video for the times when the leaf sides are reordered. To make the display conform with the current ordering method, program 11 calls subroutine adjust 93 to display the book representation turned to the next pair of facing pages. Or in the embodiment of FIG. 3, program 11 calls subroutine adjust 93 to flip 8 leaves of the book representation and reconstruct tabs and other indicia as necessary to make the display consistant with the new order.

As mentioned previously, the same program procedure for inserting/removing a leaf may be used to accomplish the reordering task. Other program procedures for reordering, inserting and/or removing leaves are in the purview of one skilled in the art.

Otherwise, main loop 91 tests for user selection or activation of a tab. In the embodiment of FIGS. 2a–2i, tabs are handled as follows. The screen view is organized, for purposes of display, in three partitions. As illustrated by the dotted lines in FIG. 2a, preferably the partitions are rectangular in shape with a first partition of the screen view holding the available tabs 49, a second partition holding the book representation 35 and a third partition holding all other icons and graphics. Such partitioning provides ease of interpretation and maneuvering.

Program 11 determines whether the user selected tab is currently in use (i.e. attached to a page of the book representation) according to position of the cursor with respect to the three screen partitions. If the cursor is in the second partition holding the book representation 35, the selected tab is currently in use and program 11 must determine to which page the tab is attached as several tabs 49 may be at (i.e. stacked at) the current cursor position. This is accomplished by program 11 determining to which side of the book opening the cursor (selected tab) lies i.e. in the series of pages succeeding the open pages and including the front facing open page or in the series of pages preceding the open pages including the back facing open page. If the cursor lies on the side of the succeeding pages, then program 11 first identifies those tabs which cover the cursor position and subsequently identifies from those tabs the tab which is coupled to the lowest book division of that side. The resulting tab is indicated to be the selected tab. If the cursor tab lies on the side of the preceding pages, then program 11 first identifies those tabs which cover the cursor position and subsequently identifies from those tabs the tab which is coupled to the highest book division. The resulting tab is indicated to be the selected tab.

Program 11 highlights (reverse videos) the identified tab to display to the user which tab was selected and sets the divwant variable to indicate the book division of the identified tab. Upon release of the mouse button or stylus change to penup mode (i.e. user selection/activation of tab completed), program 11 calls subroutine adjust 93 to turn leaves of the book representation to the divwant book division and return the selected tab to normal display. If the identified tab happens to be on a current open page, program 11 returns the selected tab to normal display attached to the open page and waits for further user action.

If the stylus remains in a pendown mode or if the mouse button is maintained depressed and the user moves the cursor, the user is removing the selected tab from its page. Program 11 returns the tab to normal display and moves the tab in accordance with user movement of the cursor. Program 11 removes the link between the tab and page in table 87 and subsequently displays the tab redrawn in the first partition (the available tabs 49 area) of the screen view. Program 11 repairs display of the page from which the tab was removed and may reposition all remaining tabs in use to maximize viewability. To accomplish the latter, program 11 employs the tab view maximizing routine described previously.

If the user selected tab is an available tab, i.e. in the first partition of the screen view, then program 11 checks for at least one open page without a tab. If there is such an open page, program 11 highlights (reverse videos) the user selected tab, moves the tab to an area of the open page in accordance with user movement of the cursor, i.e. with the mouse button depressed or the stylus maintained in the pendown mode. Upon pen-up or mouse button release, program 11 reverts the highlighting of the tab and identifies the receiving page of the tab as follows. If the back facing open page has a tab 49, program 11 identifies the front facing open page as the receiving page, and vice versa. If neither opening page has a tab 49, then program 11 identifies the receiving page to be the open page on the same side of the gap between the open pages at which the cursor was last positioned. Program 11 then links the receiving page and tab to each other in the table 87, repairs the display of the tab attached to the receiving page, and may maximize viewability of all tabs in use by executing the previously described routine.

In the embodiment of FIGS. 3a-3e, tabs are handled as follows. The program 11 determines whether the cursor 11 lies in or near a position of one of the possible tabs 81 in the outer edge portion of an open page. If so, for each user selection of tab 81, program 11 advances one step through the cycle of various tab entry values in table 87 for the open page to activate and display the tab in its various patterns. If the cursor position is not in the outer edge portion of an open page, then program 11 determines that no tab processing is to be done at this time.

Referring back to FIG. 5a, if no tab is to be processed, program 11 determines whether the foldout area of an open page is being selected/activated by user interaction. In particular if the front facing (or back facing) open page has a foldout button and the foldout is not deployed as indicated by the foldout flag in table 87 and the input device is operating on the foldout button, then program 11 deletes any foldout deployed for the back facing (front facing) open page and updates this new state in table 87. Program 11 also sets foldout flag in table 87 for the front facing (back facing) open page to declare that the foldout is deployed. For each foldout panel of the newly deployed foldout, program 11 fetches the foldout information from the respective memory source indicated in table entry 88 for the front facing (back facing) open page and generates a display thereof. According to table entry 88 of the front facing (back facing) open page, if the deployed foldout has a cross-reference then program 11 generates and displays the cross-reference panel.

If a foldout area is not being activated, program 11 tests for user activation of a displayed cross-reference area. Specifically, the book representation must be stable (not flipping pages) and the front facing (back facing) open page must have a cross reference panel displayed. If program 11 detects the cursor in the displayed cross-reference panel and user activation thereof (i.e. the mouse button is depressed or the stylus is being operated on the cross reference panel, then program 11 sets divwant to the book division of the page number indicated in the cross-reference panel. Program 11 obtains proper book division of the cross-reference page from table 87 or where normal ordering of the pages exist book division is calculated as previously described.

If none of the foregoing testing is determined in the positive and the cursor is positioned in the book representation area, then upon operation of an input device, program 11 assumes user activation of one of the leaves of the book representation. In particular, if the mouse button or stylus was previously unoperated, then program 11 computes a cursor position interpretation shift as a function of cursor position at the time of input device operation (i.e. mouse button depression or stylus pendown operation).

Specifically, input device operation with the cursor positioned on an open page without further user movement causes no page flipping until subsequent cursor movement with input device maintained in operation. Input device operation with the cursor positioned on a leaf edge of a page preceding or succeeding the open pages gets interpreted as user selection of that page. Program 11 sets divwant to the book division of the selected page. In a preferred embodiment, program 11 clips the book division divwant to a minimum of 0 and a maximum of an upper threshold based on the number of leaves of the book representation.

In addition, upon user command, through a menu selection, keyboard input and the like, to insert (delete) a user selected page, program 11 processes leaves of the book representation as follows. Program 11 updates table 87 to reflect the insertion (deletion) of the subject page. This involves rewriting (deleting) a table entry 88 in the pertinent book division and shifting succeeding entries 88. In rewriting respective entry 88 for the subject inserted page, current entry information is saved, as opposed to being overwritten, and ultimately shifted. A pointer in the rewritten entry 88 points to the memory location of the page data/image and thereby establishes a memory link to support display of the page. Further program 11 updates display of the book representation accordingly. Various techniques common in the art may be used to accomplish the foregoing insertion (deletion) of book pages.

Otherwise where program 11 does not detect operation of an input device, program 11 declares that no user selection is being made.

After the foregoing determination and processing, program 11 compares divwant (the desired or targeted book opening), as established from the foregoing processing, to divhave which indicates the book division of the currently displayed open pages. If the value of divwant is different than the value of divhave, then program 11 calls subroutine adjust 93 to flip one leaf in the desired direction. Before flipping further leaves in the desired direction, program 11 traverses through main loop 91 such that user interaction is continuously monitored between leaf turns. Effectively subroutine adjust 93 is called as many times as needed until divwant equals divhave i.e. the currently displayed open pages are the desired target pages. And as long as the input device remains activated with the cursor positioned on or near the selected page, program 11 reestablishes, possibly at an expanded scale, the targeted page as a function of possibly altered cursor position.

Subroutine adjust 93 is outlined in FIG. 5b and described next. Generally, when the book representation is not open to the target pages, subroutine adjust 93 flips one leaf in the direction of the targeted book opening and adjusts the screen view accordingly.

Subroutine adjust 93 begins by error checking the value of divwant which must be between predefined maximum and minimum valid values. If the value of divwant equals the value of divhave (i.e. the book division of the currently displayed open pages), then subroutine adjust 93 returns control to main loop 91.

Otherwise, if the flipping rate variable is set to the highest speed, then subroutine adjust 93 turns off the screen cursor to prevent cursor flickering and increase speed of display handling.

Subroutine adjust 93 next deletes any foldouts of the open pages and updates various parameters of the target pages according to table 87.

If there is to be a leaf frontside (including front cover) displayed in full view (i.e. the book representation is not closed with just the back cover showing in full), subroutine adjust 93 acts depending on the parameter that dictates pausing in the subroutine. If the book representation is stable or the subroutine is pausing at 95 in FIG. 5b, subroutine adjust 93 fetches the new front facing page image from the disk file 23, and determines from table 87 whether the fetched page has a foldout. If so, subroutine adjust 93 puts the foldout icon button on the fetched page image and also determines whether there is an associated cross reference (i.e. "SEE ALSO" icon) for the page. Subroutine adjust 93 puts the page number on the fetched page image if the number is not part of the image stored on disk 23. For the embodiment of FIG. 3a-3e, subroutine adjust 93 provides new front facing page image as described previously. In any case, the new front facing page image is held in staging buffer 19.

Figure 5B:
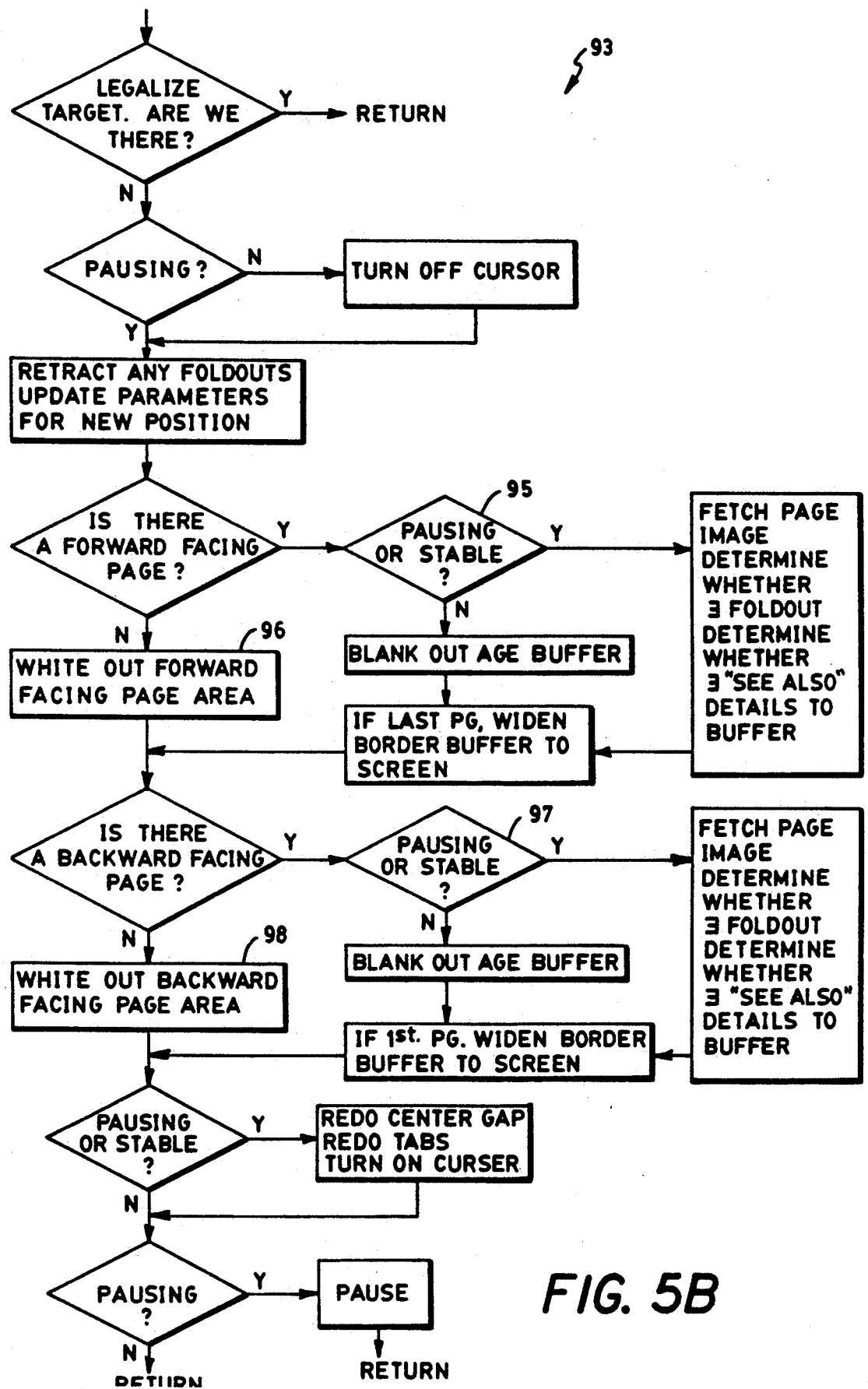

If the book representation is not stable and no pausing is to occur at 95 in FIG. 5b, subroutine adjust 93 blanks out the staging buffer 19.

If staging buffer 19 holds the last front facing page (i.e. the frontside of the backcover leaf), subroutine adjust 93 makes the right and bottom border of book representation 35 extra thick to boldly outline the book representation as a whole. Next subroutine adjust 93 transfers the contents of staging buffer 19 to screen bit map 17.

Otherwise, at 96 in FIG. 5b where there is to be no front facing page, i.e. the book representation is closed and the back cover is visible in full, subroutine adjust 93 whites out the front facing page area by putting an all white rectangle in the respective position in screen bit map 17.

If there is to be a leaf backside, subroutine adjust 93 acts according to the pausing parameter. If the book representation is stable or the subroutine is pausing at 97 in FIG. 5b, subroutine adjust 93 fetches the new back facing page image from the disk file 23. Subroutine adjust 93 determines from table 87 whether the fetched page has a foldout. If so, subroutine adjust 93 puts the foldout icon in the page image and determines whether there is an associated cross reference for the page. Also subroutine adjust 93 puts the page number on the fetched page image as needed. For the embodiment of FIGS. 3a-3e, subroutine adjust 93 provides new back facing page image as described previously. In any case, the new back facing page image is placed in staging buffer 19.

If the book representation is not stable and no pausing is to occur at 97 in FIG. 5b, subroutine adjust 93 blanks out the staging buffer 19.

If staging buffer 19 holds the first back facing page (i.e. the backside of the frontcover leaf), subroutine adjust 93 makes the left and bottom border of the book representation 35 extra thick to boldly outline the book representation as a whole. Next subroutine adjust 93 transfers the contents of staging buffer 19 to screen bit map 17.

Otherwise at 98 in FIG. 5b where there is to be no back facing page, i.e. the book representation is closed and the front cover is viewable in full, subroutine adjust 93 whites out the back facing page area by putting an all white rectangle in the respective bit map position.

Next, if the subroutine is pausing or the book representation is stable, subroutine adjust 93 refines the display by providing a gap between the displayed open pages, book rings across the gap and any other graphical refinements. Subroutine adjust 93 also provides rearrangement of the tabs for maximum viewability according to the previously described routine. Further, subroutine adjust 93 illuminates the cursor.

Also if the flipping rate is not set to the top speed, subroutine adjust 93 pauses for the required predefined pause time before returning control to the main loop 91.

While the invention has been particularly shown and described with reference to a preferred embodiment thereof, it will be understood by those skilled in the art that various changes in form and details may be made therein without departing from the spirit and scope of the invention as defined by the appended claims.

I claim:

1. In a data processing system having a digital processor and a display unit for displaying screen views, computer apparatus comprising:

means, coupled to said display unit, for displaying a multiplicity of entities in a screen view, each entity providing data desired to be displayed, the entities being displayed simultaneously and ordered in a series and aligned with each other, each entity displayed partially overlapping at least one of a respective succeeding entity and a respective preceding entity in at least one display of the series, such that edge portions of entities are non-overlapped and viewable, said edge portions serving as non-overlapped portions of the entities and displaying non-overlapped contents of the entities, entities in the series having a currently displayed entity which is non-overlapped and which has a predetermined number of immediate succeeding and preceding entities having wider exposed edge portions than edge portions of entities beyond the predetermined number of succeeding and preceding entities in the ordered series;

means for indicating a user-desired entity, by user selection of a non-overlapped portion of the desired entity; and processor means for controlling said displaying means to display the user-desired entity non-overlapped in the series by changing display of the series from a screen view of the currently displayed entity in the series having the user-desired entity partially overlapped by at least one of a preceding and succeeding entity, through intermediate screen views of entities in the series to a screen view the user-desired entity in of the series having each entity succeeding the user-desired entity in the series partially overlapping a respective succeeding entity and each entity preceding the user-desired entity in the series partially overlapping a respective preceding entity.

2. Apparatus as claimed in claim 1 wherein the series of entities forms a workable book representation, having (i) a front cover at a beginning of the series of entities and (ii) a back cover at an end of the series of entities, each entity being a leaf of the book representation and having a frontside providing a page of desired information and a backside providing a page of desired information, only one side of each leaf being viewable at a time and in a manner such that each leaf backside when viewable partially overlaps a respective preceding leaf backside and each leaf frontside when viewable partially overlaps a respective succeeding leaf frontside.

3. Apparatus as claimed in claim 2 wherein the processor means controls said displaying means to simultaneously display a backside of one leaf adjacent a frontside of a successive leaf both non-overlapped to display the book representation in an open book state in response to user selection of a non-overlapped portion of one of the backside of one leaf and the frontside of the successive leaf, said book representation in the open state including each preceding leaf backside of the one leaf displayed partially overlapping the leaf backside preceding it and each succeeding leaf frontside of the succeeding leaf displayed partially overlapping the leaf frontside succeeding it.

4. Apparatus as claimed in claim 2 wherein in response to user selection of a non-overlapped portion of a desired leaf side spaced from a leaf currently displayed non-overlapped, the processor means controls said displaying means to display the book representation in a leaf turning state where each pair of a backside of one leaf and a frontside of a successive leaf, in series order, from the currently displayed non-overlapped leaf to the desired leaf side is displayed one at a time, non-overlapped, at a screen position spaced between screen position of the displayed front cover and back cover of the book representation, there being a different screen position for different pairs, and for each pair in series order, screen position changing incrementally toward one of the front and back covers of the book representation, such that the book representation is displayed temporarily open to each of the pairs of leaf sides.

5. Apparatus as claimed in claim 2 further comprising: means, coupled to said displaying means, for controlling the displaying means to change display of the book representation from a current display state to a display state in which a succession of pairs of a backside of one leaf and a frontside of a succeeding leaf is displayed, one pair at a time, in serial order, non-overlapped in the screen view, in response to user input.

6. Apparatus as claimed in claim 1 wherein each entity has a respective screen view position as a function of serial position in the series, such that the processor means controls the displaying means to display successive entities having serial positions successively closer to a beginning of the series, at respective screen view positions successively closer to one end of the screen view, and to display successive entities having serial positions successively closer to an end of the series, at respective screen view positions successively closer to an opposite end of the screen view.

7. Apparatus as claimed in claim 1 further comprising means for displaying a plurality of tabs which in response to user input are coupled to entities as desired by a user, and in response to subsequent user input are removed from said entities as desired by a user.

8. Apparatus as claimed in claim 7 wherein said means for displaying said plurality of tabs is responsive to user input to change appearance of the tabs from one user defined design to another.

9. Apparatus as claimed in claim 7 wherein said means for displaying said plurality of tabs displays each tab in one of a plurality of predefined patterns, each pattern including a different color and design.

10. Apparatus as claimed in claim 7 wherein said means for displaying said plurality of tabs displays each tab at one of a plurality of predefined tab positions.

11. Apparatus as claimed in claim 7 wherein the processor means further comprising control means for controlling said means for displaying the plurality of tabs to adjust position of tabs on respective entities in response to the processor means changing of display of the series, said control means adjusting position of tabs on respective entities in a manner that maximizes visibility of the tabs on entities displayed partially overlapped in the series.

12. Apparatus as claimed in claim 7 wherein in response to user selection of a tab, the processor means controls said displaying means to select and display the entity with which the user selected tab is associated, non-overlapped in the series, by changing display of the series such that each succeeding entity in the series partially overlaps a respective succeeding entity and each preceding entity partially overlaps a respective preceding entity.

13. Apparatus as claimed in claim 1 further comprising computer means for displaying additional information corresponding to an entity upon user command.

14. Apparatus as claimed in claim 1 further comprising a computer means for reordering serial positions of entities from one position in the ordered series to another position.

15. Apparatus as claimed in claim 1 further comprising graphical means for indicating serial positions of entities in the series.

16. Apparatus as claimed in claim 1 wherein the series of entities is a first series; and further comprising computer means for displaying at least a second series of entities upon user command during display of a corresponding entity non-overlapped in the first series of entities.

17. Apparatus as claimed in claim 1 further comprising computer means for inserting and removing entities from the series of entities.

18. In a data processing system having a digital processor and a display unit for displaying screen views, a method of providing a working representation of a book in screen views, comprising the steps of:

displaying in a screen view on the display unit, a series of entities forming a book representation having (a) a front cover at a beginning of the series of entities and (b) a back cover at an end of the series of entities, each entity providing data desired to be displayed, the entities displayed aligned with each other along an axis extending from the front cover to the back cover, each entity displayed partially overlapping one of a respective succeeding entity and a respective preceding entity, such that data of only non-overlapped portions of entities are viewable, each entity displayed having a respective screen view position along the axis such that entities having serial positions closer to a beginning of the series are displayed at respective screen view positions closer to the front cover end of the axis, and entities having serial positions closer to the end of the series are displayed at respective screen view positions closer to the back cover end of the axis, entities in the series having a currently displayed entity which is non-overlapped and which has a predetermined number of immediate succeeding and preceding entities having a wider exposed area than the entities beyond the predetermined number of succeeding and preceding entities in the series; and changing display of the series from a screen view of the currently displayed entity in the series having a desired entity partially overlapped by at least one of a preceding entity and a succeeding entity, through intermediate screen views of entities in the series, to a screen view the desired entity in of the series having each entity succeeding the desired entity partially overlapping a respective succeeding entity and each entity preceding the desired entity partially overlapping a respective preceding entity, said changing accomplished by the digital processor displaying one working entity at a time, in series order, non-overlapped in its respective screen view position along the axis, with each entity succeeding the working entity partially overlapping a respective succeeding entity, and each entity preceding the working entity partially overlapping a respective preceding entity.

19. A method as claimed in claim 18 further comprising the step of providing indications of serial positions of entities in the series.

20. A method as claimed in claim 19 wherein the step of providing indications includes a step of displaying a different page number for each entity.

21. A method as claimed in claim 18 further comprising the steps of:

associating a respective plurality of tabs with desired entities, in response to user input; and defining at least one of size, shape, color and caption of said tabs in response to further user input.

22. A method as claimed in claim 21 wherein the step of changing display of a series includes the step of adjusting position of tabs on associated entities in a manner that maximizes visibility of the tabs on entities displayed partially overlapped in the series.

23. A method as claimed in claim 21 wherein the changing display step comprises the step of:

upon user selection of a tab associated with a desired entity, changing from display of the series having the desired entity partially overlapped by at least one of a preceding entity and a succeeding entity, to display of the series having the desired entity with which the user selected tab is associated displayed non-overlapped in its screen view position, and each succeeding entity in the series being displayed partially overlapping a respective succeeding entity and each preceding entity being displayed partially overlapping a respective preceding entity.

24. A method as claimed in claim 18 wherein the step of changing display of the series includes for each display of a non-overlapped entity, displaying a portion of the data provided by the entity.

25. A method as claimed in claim 18 further comprising the step of displaying at least a secondary book representation upon user command during display of a corresponding entity non-overlapped in the book representation.

26. A method as claimed in claim 18 further comprising the step of reordering serial position of entities in the book representation from one position in the series to another.

27. A method as claimed in claim 18 further comprising the step of changing series order of the entities by selectively performing one of inserting a leaf, and removing a leaf, in response to user input.

* * * * *